United States Patent [19]

Gerum et al.

[11] Patent Number: 4,869,557

[45] Date of Patent: Sep. 26, 1989

[54] DRIVER BRAKE VALVE

[75] Inventors: Eduard Gerum, Munich; Erik Hefter, Eichenau; Gerd Kessel, Olching; Manfred Weissflog, Munich, all of Fed. Rep. of Germany

[73] Assignee: Knorr-Bremse AG, Munich, Fed. Rep. of Germany

[21] Appl. No.: 145,666

[22] Filed: Jan. 14, 1988

Related U.S. Application Data

[63] Continuation of Ser. No. 797,380, Dec. 20, 1985, abandoned.

[30] Foreign Application Priority Data

Feb. 23, 1984 [DE] Fed. Rep. of Germany ....... 3406612

[51] Int. Cl.$^4$ .............................................. B60T 13/68
[52] U.S. Cl. ......................................... 303/3; 303/15; 303/20; 303/DIG. 3
[58] Field of Search .......... 303/15, 3, 20, 92, DIG. 3, 303/DIG. 4

[56] References Cited

U.S. PATENT DOCUMENTS

| | | | |
|---|---|---|---|
| 3,402,972 | 9/1968 | Cooper et al. | 303/DIG. 3 |
| 3,767,272 | 10/1973 | Leiber | 303/92 |
| 3,814,484 | 6/1974 | Matthews et al. | 303/15 |
| 3,874,743 | 4/1975 | Fleischer et al. | 303/92 |
| 3,920,285 | 11/1975 | Maskery | 303/15 |
| 4,501,170 | 2/1985 | Muller et al. | 74/856 |

FOREIGN PATENT DOCUMENTS

| | | | |
|---|---|---|---|
| 0032567 | 7/1981 | European Pat. Off. | |
| 2436049 | 4/1980 | France | |
| 0114152 | 7/1984 | Japan | 303/DIG. 3 |
| 2035487 | 7/1980 | United Kingdom | 303/15 |

Primary Examiner—David K. Moore
Assistant Examiner—Alvin Oberley
Attorney, Agent, or Firm—Pollock, Vande Sande & Priddy

[57] ABSTRACT

Driver brake valve for operating compressed air brakes of rail vehicles. An electropneumatic converter is used to generate a servopressure. The servopressure actuates a relay valve for pressurizing a main air line. An electronic regulation circuit receives a plurality of electrical control signals, including a signal proportional to the pneumatic servo-pressure. The regulation circuit generates an ideal value signal for controlling the electropneumatic converter and controls the starting behavior of the brake system. Brake demands which exceed a threshold value are applied to the electronic circuit which generates the ideal value signal. Pressure sensors connected to the main air line and a flow sensor connected to a main container line are used to derive the ideal values for controlling the pneumatic servopressure and the operation of the relay valve.

17 Claims, 32 Drawing Sheets

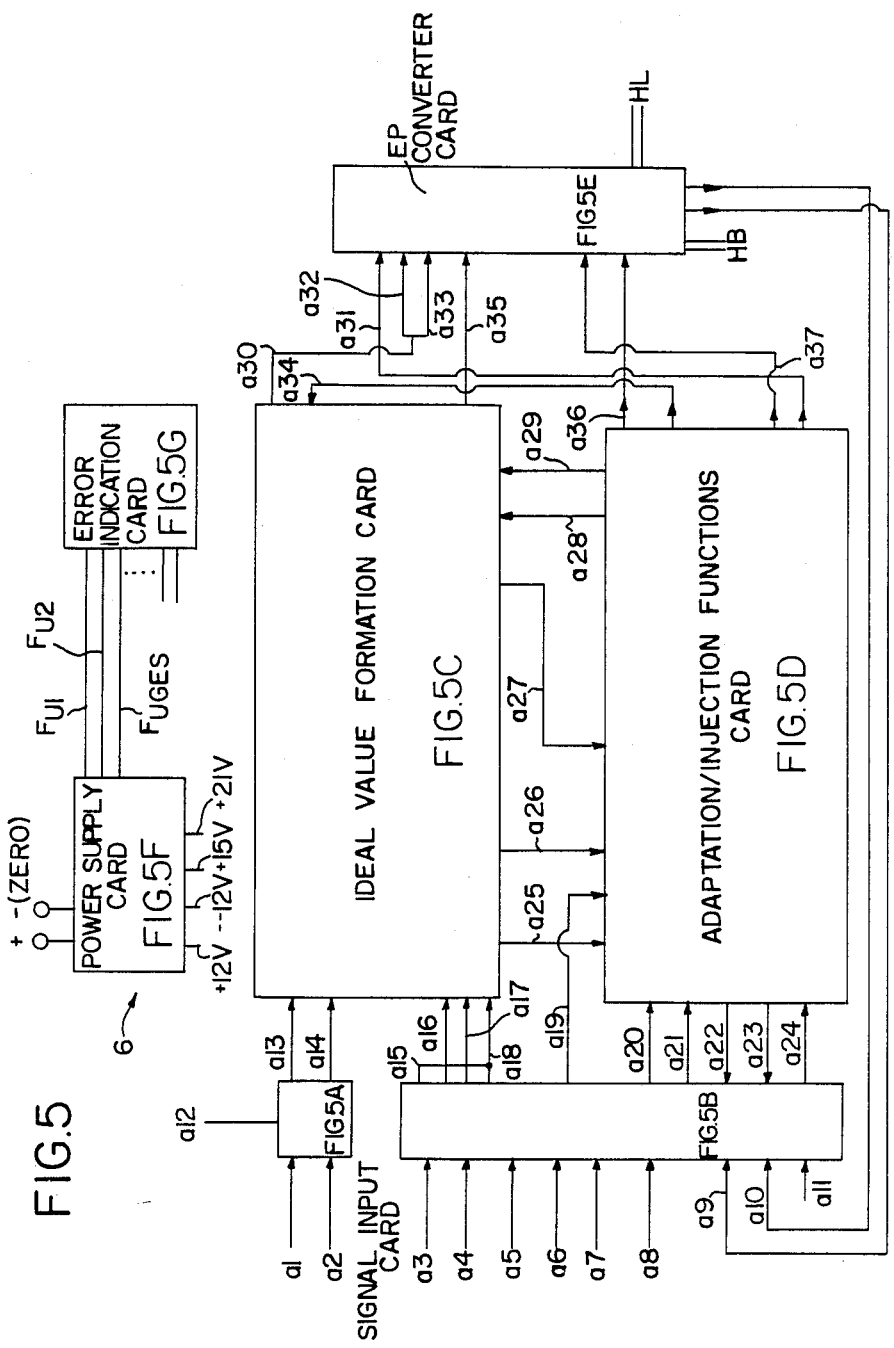

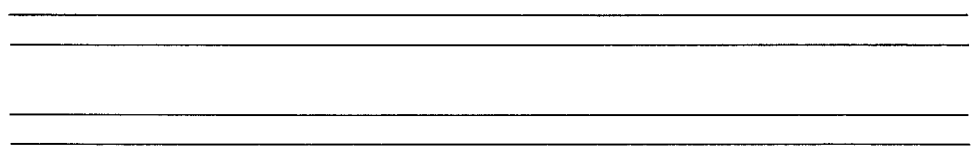
FIG.8G

FIG.8L

| FIG.8E | FIG.8K |
| FIG.8D | FIG.8I |
| FIG.8C | FIG.8H |
| FIG.8B | FIG.8G |
| FIG.8A | FIG.8F |

| FSA | FSB | ABE | LÖE | BRE | ANE | FÜE | QW | Actuation | Function |
|---|---|---|---|---|---|---|---|---|---|
| 0 | 0 | 0 | 0 | 0 | 0 | 0 | 0 | Lock: 0<br>Switch: Oper<br>Control<br>Table: 0 | Off |
| 0 | 0 | 0 | 0 | 0 | 0 | 0 | 0 | Lock: I<br>Switch: Oper<br>Control<br>Table: 0 | Off |
| U<br>0 | 0<br>U | U<br>U | 0<br>0 | U<br>U | 0<br>0 | 0<br>0 | 0<br>0 | Lock: I<br>Switch: Oper<br>Control<br>Table: Ctrl Tab<br>Lever: Brk Const | Constant<br>braking<br>power<br>(wkshop) |
| U<br>0 | 0<br>U | U<br>U | 0<br>0 | 0<br>0 | 0<br>0 | 0<br>0 | 0<br>0 | Lock: I<br>Switch: Oper<br>Control<br>Table: Ctrl Tab<br>Lever: Braking | braking<br>(wkshop) |
| U<br>0 | 0<br>U | U<br>U | U<br>U | U<br>U | 0<br>0 | 0<br>0 | 0<br>0 | Lock: I<br>Switch: Oper<br>Control<br>Table: Ctrl Tab<br>Lever: Neutral | Release<br>(Wkshop) |
| U<br>0 | 0<br>U | 0<br>0 | 0<br>0 | U<br>U | 0<br>0 | 0<br>0 | 0<br>0 | Lock: I<br>Switch: Tightn.Test<br>Control<br>Table: Ctrl Tab<br>Lever: Brk Const | Tightness<br>test<br>(Wkshop) |
| U<br>0 | 0<br>U | U<br>U | U<br>U | U<br>U | 0<br>0 | 0<br>0 | U<br>U | Lock: I<br>Switch: Pump-up<br>Control<br>Table: Ctrl Tab<br>Lever: Neutral | Pumping Up<br>(Wkshop) |
| 0 | 0 | 0 | 0 | 0 | 0 | 0 | 0 | Lock: II<br>Switch: Oper<br>Control<br>Table: 0 | Off |
| U<br>0 | 0<br>U | U<br>U | 0<br>0 | U<br>U | 0<br>0 | 0<br>0 | 0<br>0 | Lock: II<br>Switch: Oper<br>Control<br>Table: Ctrl. Trn.<br>Lever: Brk const | Constant<br>Braking<br>Power |

FIG.9A

| | | | | | | | | | | |
|---|---|---|---|---|---|---|---|---|---|---|
| U | 0 | U | 0 | 0 | 0 | 0 | 0 | Lock: | II | |
| 0 | U | U | 0 | 0 | 0 | 0 | 0 | Switch: Oper | | Braking |
| | | | | | | | | Control | | |
| | | | | | | | | Table: | Ctrl. Trn. | |
| | | | | | | | | Lever: | Braking | |
| | | | | | | | | | | |
| U | 0 | U | U | U | 0 | 0 | 0 | Lock: | II | |
| 0 | U | U | U | U | 0 | 0 | 0 | Switch: Oper | | Release |
| | | | | | | | | Control | | No |
| | | | | | | | | Table: | Ctrl Trn | braking |
| | | | | | | | | Lever: | Neutral | power |
| | | | | | | | | | | |
| U | 0 | 0 | 0 | U | 0 | 0 | 0 | Lock: | II | |
| 0 | U | 0 | 0 | U | 0 | 0 | 0 | Switch: Tightn.Test | | Tightness |
| | | | | | | | | Control | | Test |
| | | | | | | | | Table: | Main switch | Operation |
| | | | | | | | | Lever: | Brk const | |
| | | | | | | | | | | |
| U | 0 | U | U | U | 0 | 0 | U | Lock: | II | |
| 0 | U | U | U | U | 0 | 0 | U | Switch: Pumping up | | Pumping Up |
| | | | | | | | | Control | | Operation |
| | | | | | | | | Table: | Main switch | |
| | | | | | | | | Lever: | Neutral | |
| | | | | | | | | | | |
| U | 0 | U | 0 | U | U | 0 | 0 | Lock: | II | |
| 0 | U | U | 0 | U | U | 0 | 0 | Switch: Oper | | Braking |
| | | | | | | | | Control | | by switch- |
| | | | | | | | | Table: | Ctrl Trn | stop |
| | | | | | | | | Lever: | Neutral | |
| | | | | | | | | Switch Key: Stop | | |
| | | | | | | | | | | |
| U | 0 | U | 0 | U | U | 0 | 0 | Lock: | II | |
| 0 | U | U | 0 | U | U | 0 | 0 | Switch: Oper | | Adaptation |
| | | | | | | | | Control | | |
| | | | | | | | | Table: | Ctrl. Trn. | |
| | | | | | | | | Lever: | Brk const | |
| | | | | | | | | Adapt. Key | | |
| | | | | | | | | | | |
| U | 0 | U | U | U | U | 0 | 0 | Lock: | II | |
| 0 | U | U | U | U | U | 0 | 0 | Switch: Oper | | Adaptation |
| | | | | | | | | Control | | & |
| | | | | | | | | Table: | Ctrl Trn | Release |
| | | | | | | | | Adapt. Key | | |
| | | | | | | | | Lever: | | |
| | | | | | | | | | | |
| U | 0 | U | U | U | 0 | U | U | Lock: | II | |
| 0 | U | U | U | U | 0 | U | U | Switch: Oper | | Full |
| | | | | | | | | Control | | Release |
| | | | | | | | | Table: | Ctrl Trn | |
| | | | | | | | | Lever: | Brk const/Ctrl Trn | |
| | | | | | | | | Inject. Key <u>Short</u> | | |
| | | | | | | | | | | |
| U | 0 | U | U | U | 0 | U | U | Lock: | II | |
| 0 | U | U | U | U | 0 | U | U | Switch: Oper | | Full |
| | | | | | | | | Control | | Release |
| | | | | | | | | Table: | Ctrl Trn | & |
| | | | | | | | | Lever: | Brk const/ | Manual |
| | | | | | | | | | Ctrl Trn | Injection |
| | | | | | | | | Inject. Key <u>Long</u> | | |

POSSIBLE INPUT SIGNALS -- COMBINATIONS FOR RADIO CONTROL

| FSA | FSB | ABE | LÖE | BRE | ANE | FÜE | QW | FUNCTION |
|---|---|---|---|---|---|---|---|---|
| O | O | U | O | U | O | O | O | CONSTANT BRAKING POWER |
| O | O | U | O | O | O | O | O | BRAKING |
| O | O | U | U | U | O | O | O | RELEASE |
| O | O | U | O | U | U | O | O | ADAPTATION |
| O | O | U | U | U | U | O | O | ADAPTATION & RELEASE |
| O | O | U | O | U | O | U | U | FULL-RELEASE (FÜE KEY SHORT) |
| O | O | U | O | U | O | U | U | FULL RELEASE & MANUAL INJECTION (FÜE KEY LONG) |

UNAUTHORIZED INPUT SIGNAL COMBINATIONS

| FSA | FSB | ABE | LÖE | BRE | ANE | FÜE |
|---|---|---|---|---|---|---|
| U → U | | O,U | O,U | O,U | O,U | O,U |
| O,U | O,U | O → U | | O,U | O,U | O,U |
| O,U | O,U | U | O | O → U | | O |
| O,U | O,U | U | O | O | O | U |
| O,U | O,U | U | O | O → U | U | U |

OCCURANCE LEADS TO FULL BRAKING

CONTRADICTIONS

DRIVER BRAKE VALVE

This application is a continuation of application Ser. No. 797,380 filed Dec. 20, 1985, now abandoned.

FIELD OF THE INVENTION

The invention concerns a driver brake valve for automatic, indirectly operational compressed-air brakes of rail vehicles.

BACKGROUND OF THE INVENTION

Such a driver brake back-feeding pre-steering servo devices are provided for the steering of a servo medium which may be either pneumatic or electric. A valve unit (analog converter) converts the appropriate signal level of the servo medium to a corresponding servo pressure, which controls a relay valve, which directs the pressure in the main air line corresponding to the servo pressure.

The servo devices (input units) are, in this case, formed as pure electrical switches whose output signals affect the magnet valves of the analog converters directly. In order to be able to set the servo pressure in a non-linear manner from the activation times of the electrical switches for the various procedures such as braking, releasing, adapting, injection, etc., the known analog converter has elaborate pneumatic devices similar to those of the known purely pneumatic driver brake valves (Cf. house publication of KnoorBremse GmbH: "Führerbremsventilanordnung HDR für Streckenlok," 1974 edition - "HDR Drive Brake Valve System for Long-Distance Locomotives") (TK3 0022a). From DE-A-31 49 110, an electro-pressure-medium braking system for directly-operating brakes of road vehicles is known, in which the brake medium pressure is modified directly by means of magnetic valves controlled by electrical signal emitters. This brake system is not suitable for automatic indirectly-operating air-pressure brakes on rail vehicles.

Finally, a regulating switch system for aircraft brakes is known from EP-B1-0026725, in which an electronic regulating switch directly affects electromagnetic valves, which directly change the brake medium pressure. This system, too, is unsuitable for indirectly operational brakes.

SUMMARY OF THE INVENTION

The problem addressed by the invention is to improve the driver brake valve of the type described so as to provide a very precise and operationally safe driver brake valve with reduced mechanical and/or pneumatic effort, which meets the existing safety requirements and has improved functional capability, particularly in regard to release, adaptation and filling procedures, when compared to the traditional driver brake valves, which largely operate pneumatically. With the driver brake valve according to this invention, the functions of the known pneumatic or electro-pneumatic driver brake valves are electronically reproduced, while improved adaptation, release and filling operations are the specific advantages obtained, in addition to improved monitoring functions. It is particularly advantageous that super-pressurization can be implemented during injection which exceeds the super-pressurization possible in pneumatic servo valves. With the hitherto existing pressure drop after the injection, the possible super-pressure was limited by the gradients of the drops. The gradient thus had to be so low that the relay valve did not make any demand in the direction of braking. With the driver brake valve according to this invention, the gradient of the pressure drop can be set very exactly, and as slowly as desired, so that the demand limit of the relay valve is approached more sharply.

By measurement of the backfeed effect main container (HB) line, the conditions "emergency braking" and "train separation" can be distinguished, even in the critical case of an train separation during a injection or during a release procedure.

As with conventional pneumatic driver brake valves, a cross-section exchange takes place during the injection, i.e., the backfeed from the HB-line occurs during the injection by way of a larger, switchable cross-section. The demand for a cross-section exchange is made for safety reasons by most railway administrations. The reason for this is the fact that with emergency braking or train separation, the forward section of the train is reliably braked, and an excessively high pressure is not maintained in the forward train section because of an excessively high backfeed effect. Since the reverse switching of the cross-section exchange, i.e., the reverse switching to the smaller cross-section for the normal release procedure, is achieved in dependence on the effect of the pressure (e.g., upon attainment of an HL pressure of 5.65 bar), the larger cross-section can be open for a longer period due to the time-linear pressure drop during injection, since the time- linear pressure drop is higher than a pressure drop after an e- function of a pure pneumatic driver brake valve.

Since the admissible HL pressure can be oriented to the maximum admissible pressure at the first control valve even during release, a more rapid release can be obtained, which means shorter release times (which are dependent upon the admissible pneumatic servo-pressure (A-pressure) superincreases in the driver brake valve). Increase and decrease of the A-pressure are dependent on the backfeed effectiveness and hence on the length of the train.

If, due to the measured backfeed effectiveness, a very long train is ascertained, a still further A-pressure increase can be implemented. Additional advantages of the invention result from the fact that the control stations have only electrical servo control units, and that pneumatic lines are no longer required in the control station. In this way, greater flexibility is obtained in the incorporation of servo units in the contreol consol, as well as space saving compared to the voluminous, purely pneumatic servo units, as the result of the smaller electronic servo unit.

The fact that the SIFA loop does not touch the central electronic unit is part of the safety design of the driver brake valve according to this invention. Even if the electronic unit fails, rapidstop braking is still possible.

The purely electronic formulation of the desired value (dependent on either time or setting) also enables multifaceted monitoring functions which increase safety. Thus, with a more precise logic, unauthorized operating conditions, such as the simultaneous existence of a demand for braking and release, can easily be recognized. It is also possible, within certain limits, to monitor the correct functioning of the individual structural components. For example, the correct functioning of an indicator of the desired brake value (e.g., a potentiometer or step switch) can be monitored by having a base value ($U_O$) continually generated, which can be monitored. This basic value is subtracted prior to the final formulation of the desired brake value, so that it does not cause any error. Also, all supply voltages can be monitored. Further monitoring functions are indicated in the following description.

By means of a simple logic, it is also possible to ascertain an effect behavior with a linear potentiometer by indicating the desired brake value, i.e., so that braking will only occur when the brake request signal has reached a defined, predetermined value corresponding to the first stage of braking. Competing brake request signals from the driver's brake lever, an automatic drive and brake control (AFB) or an automatic train control (ATC) are processed by means of a maximum value selection, which permits the ascertainment through simple electronic means that in each case, the maximum of several brake request signals is effective.

Adaptation to different standards such as the American AAR standard, the European UIC standard, etc., are possible by means of simple switching measures. Structural modification of the pneumatic effectiveness unit are not required.

Obviously, it is also possible to have all the signal preparation functions of the regulation logic processed by a programmed microprocessor, so that modifications can be implemented in a simple manner through program modifications.

BRIEF DESCRIPTION OF THE DRAWINGS

The invention will now be explained in greater detail with reference to several embodiments illustrated in the accompanying drawings, in which:

FIG. 5 is overview (attachment plant) to clarify the connection of the structural components according to the groups 5A through 5G;

Figure 8:
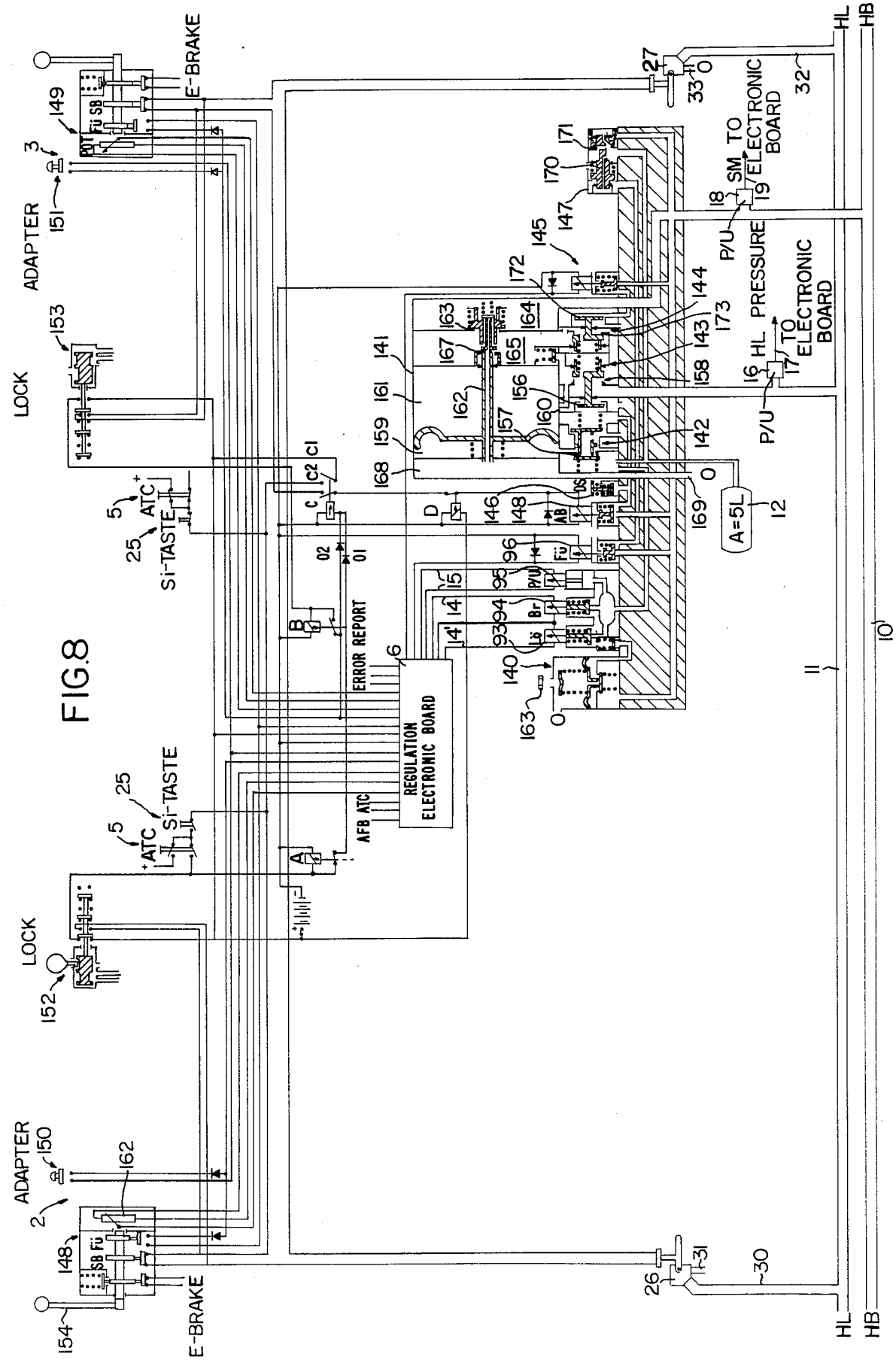
FIG. 8 is a diagram for clarification of the pneumatic part of the driver brake valve according to the invention.
Figure 8A:
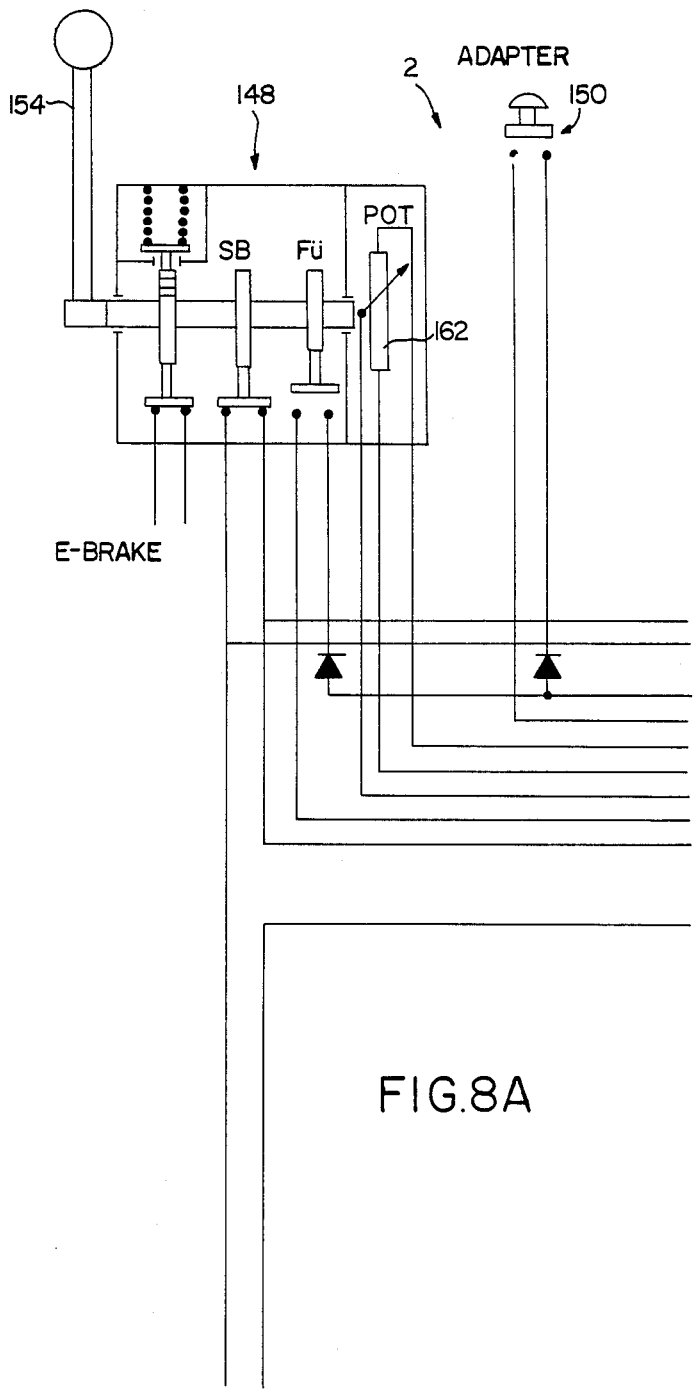
Figure 8B:
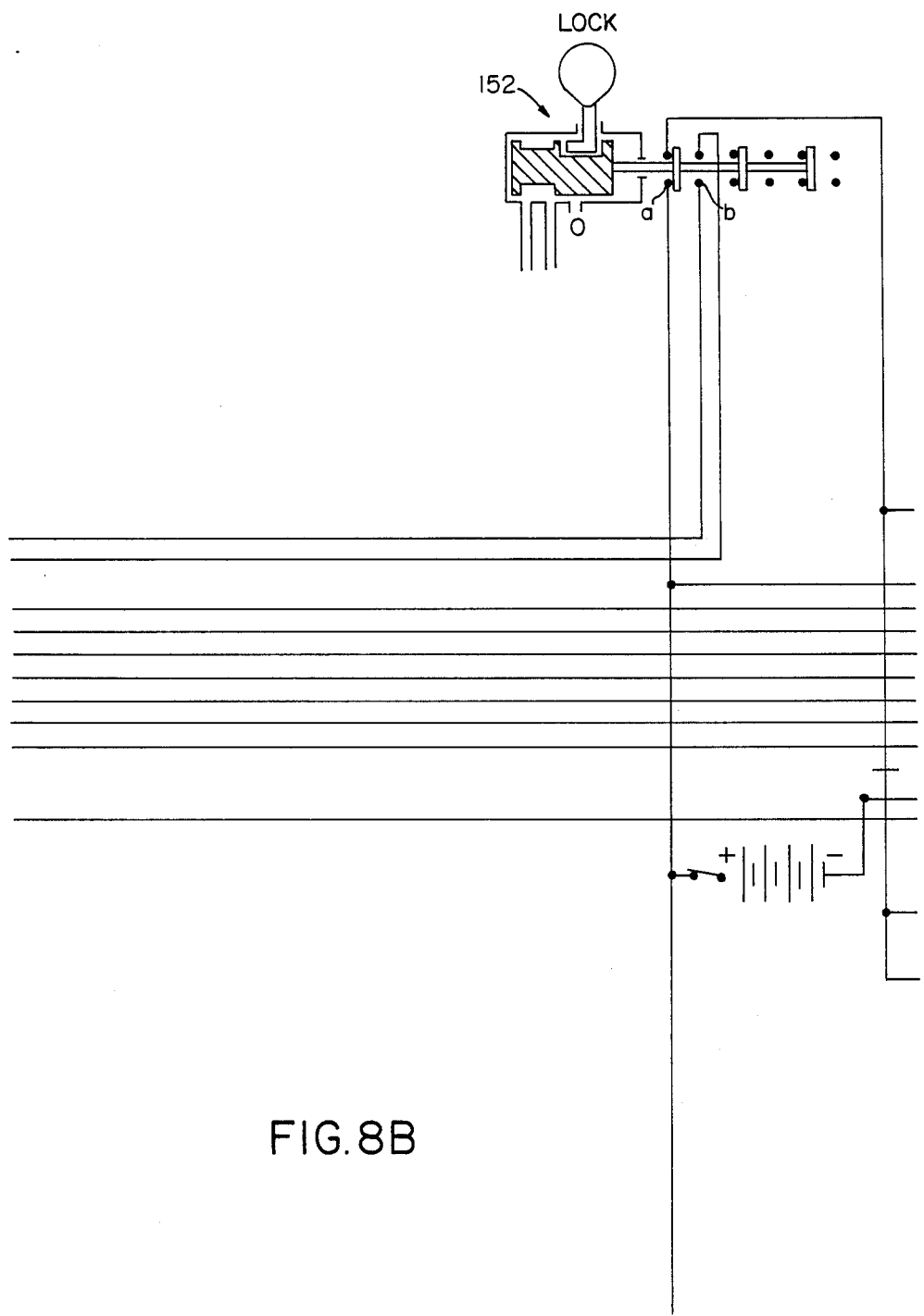
Figure 8C:
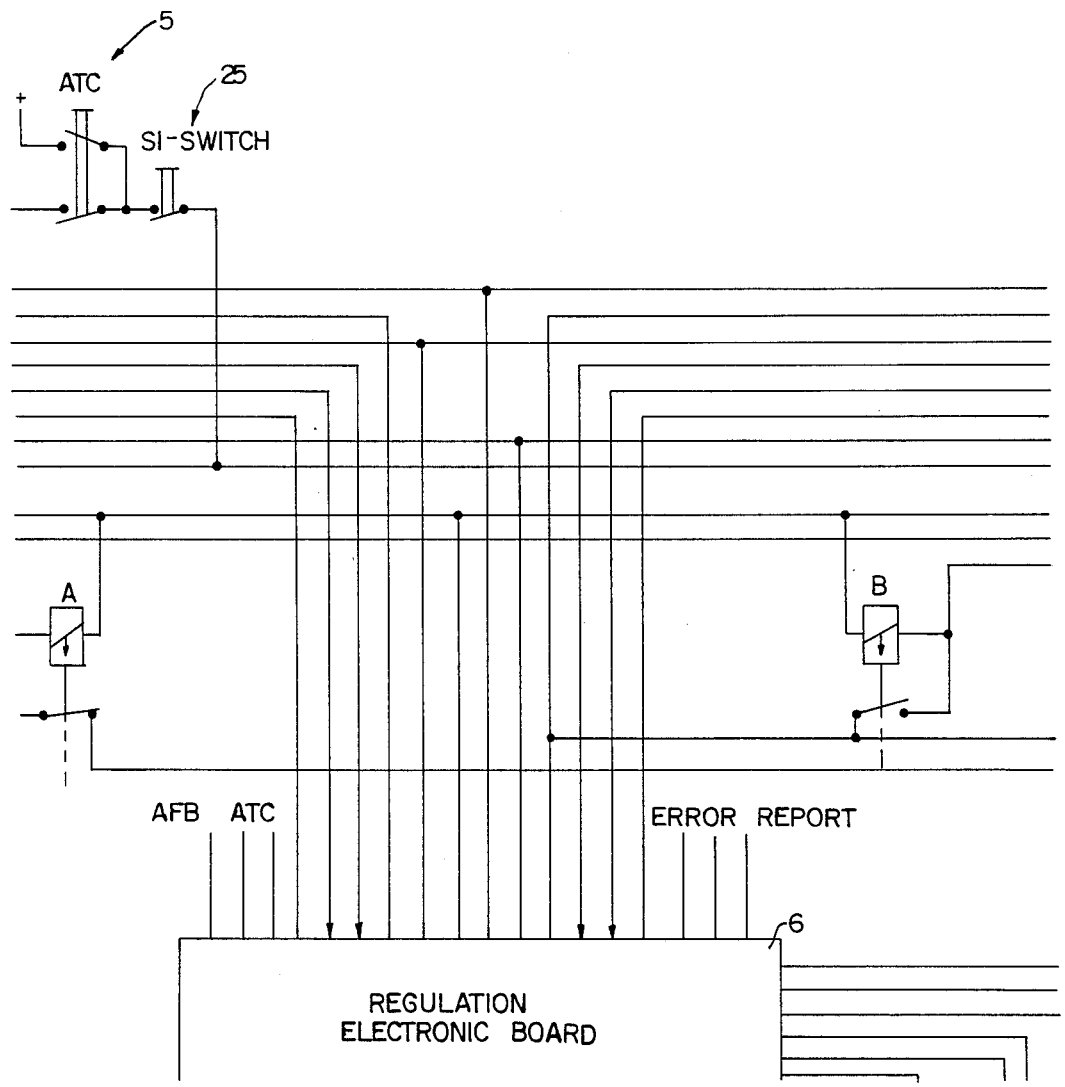
Figure 8D:
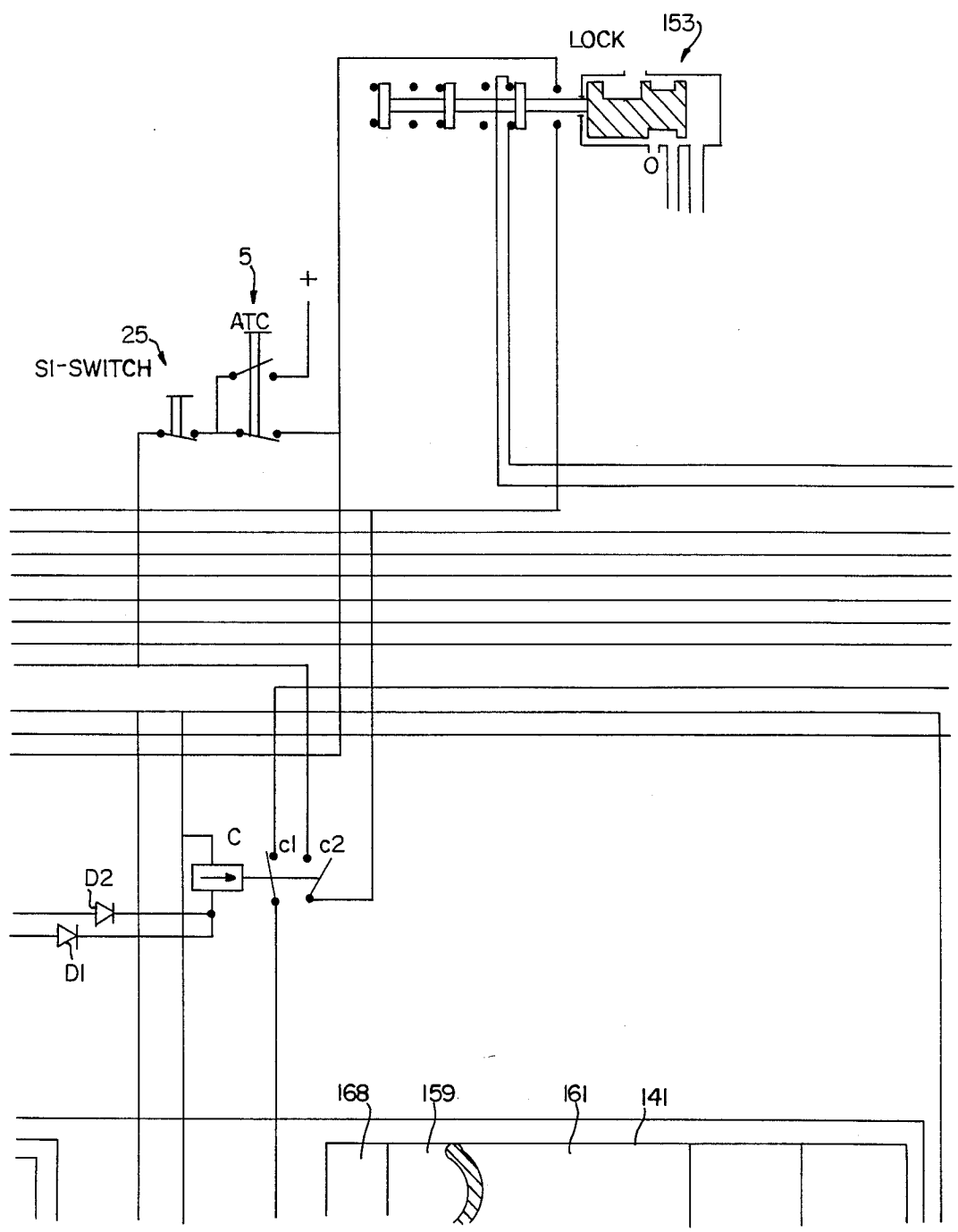
Figure 8E:
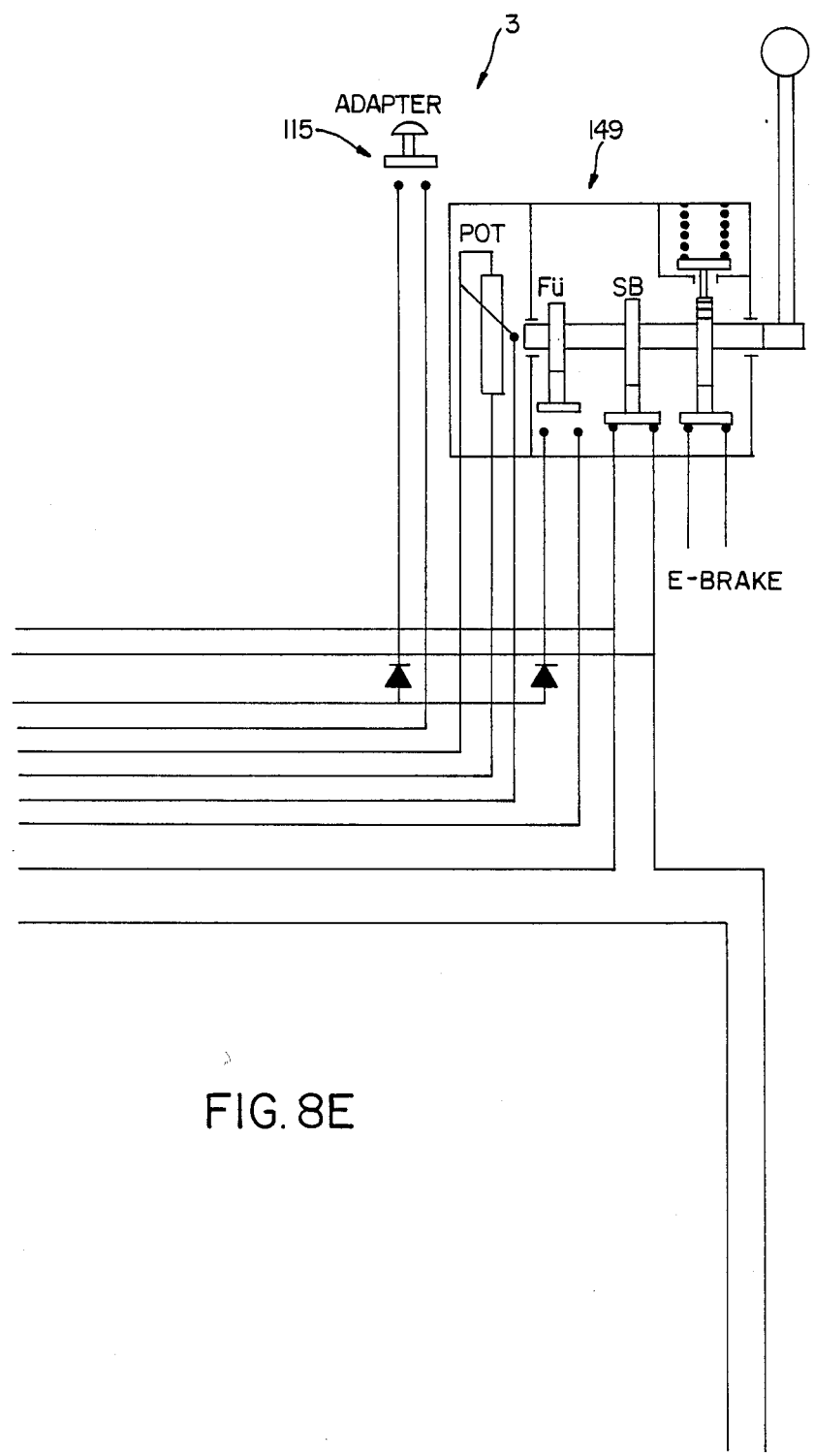
Figure 8F:
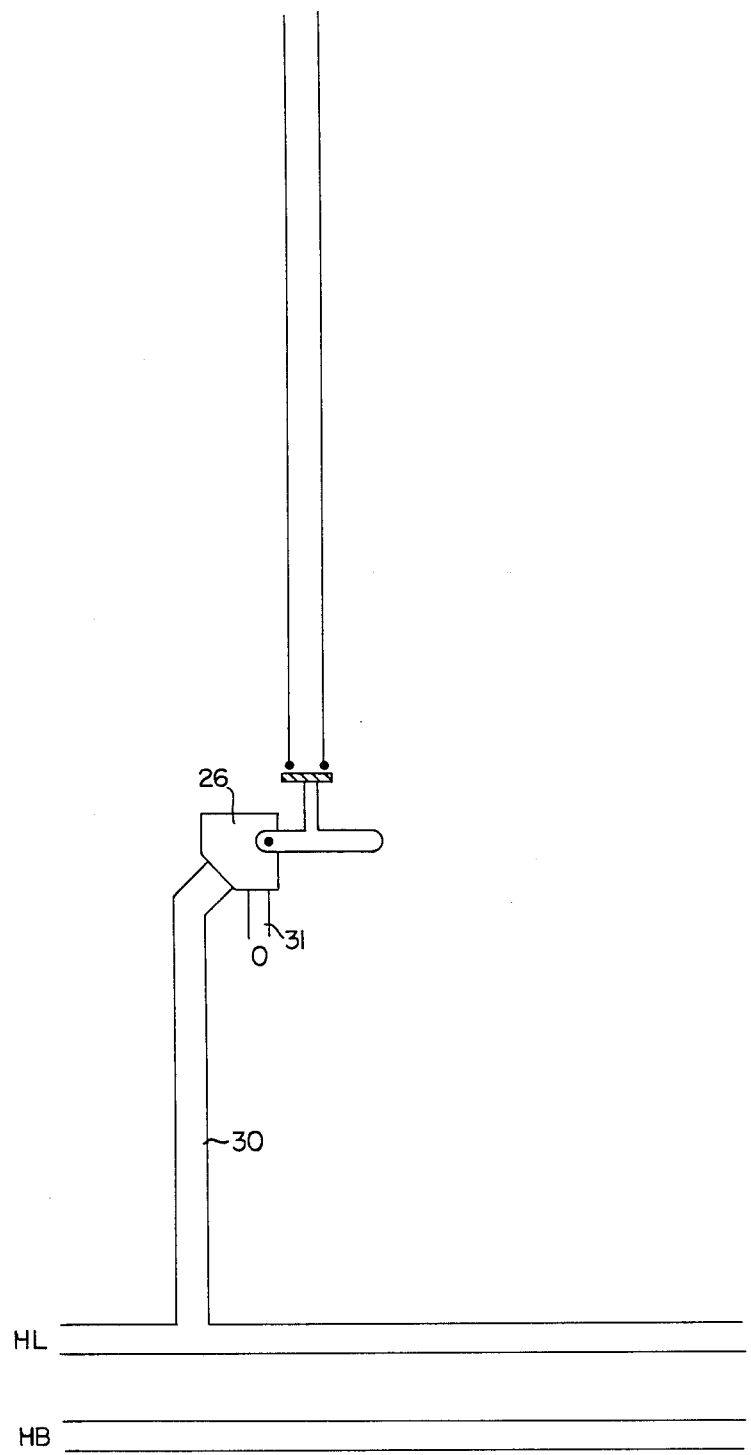
Figure 8H:
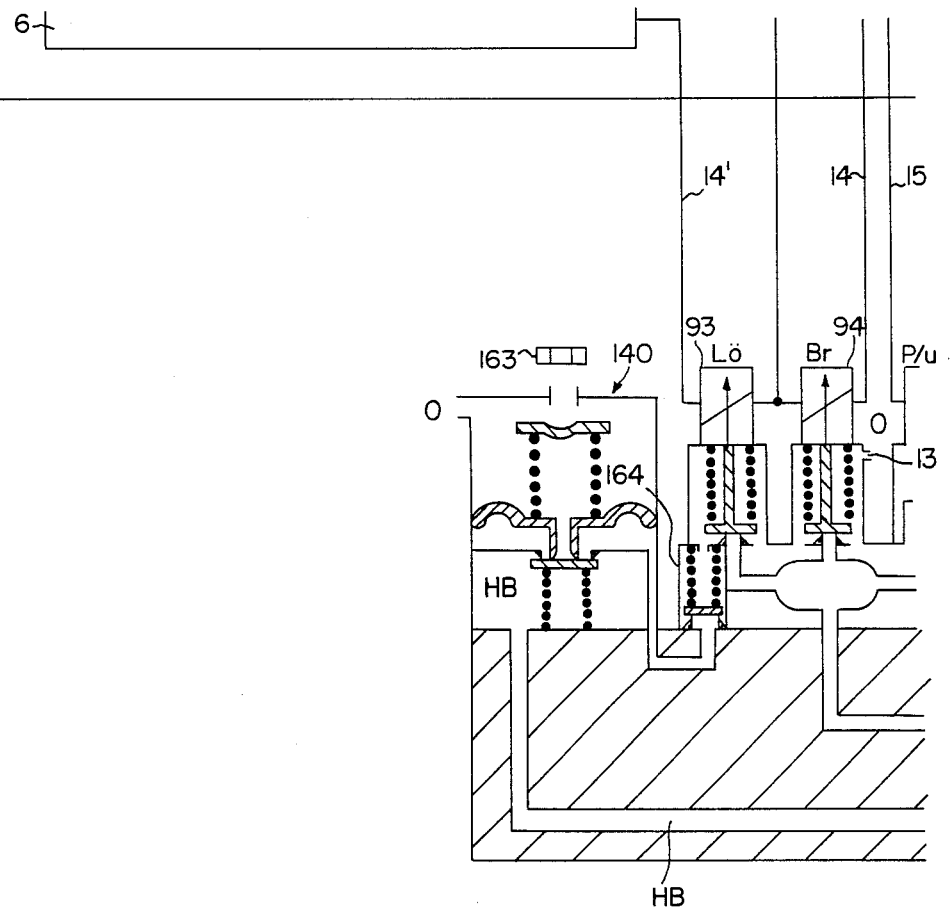
Figure 81:
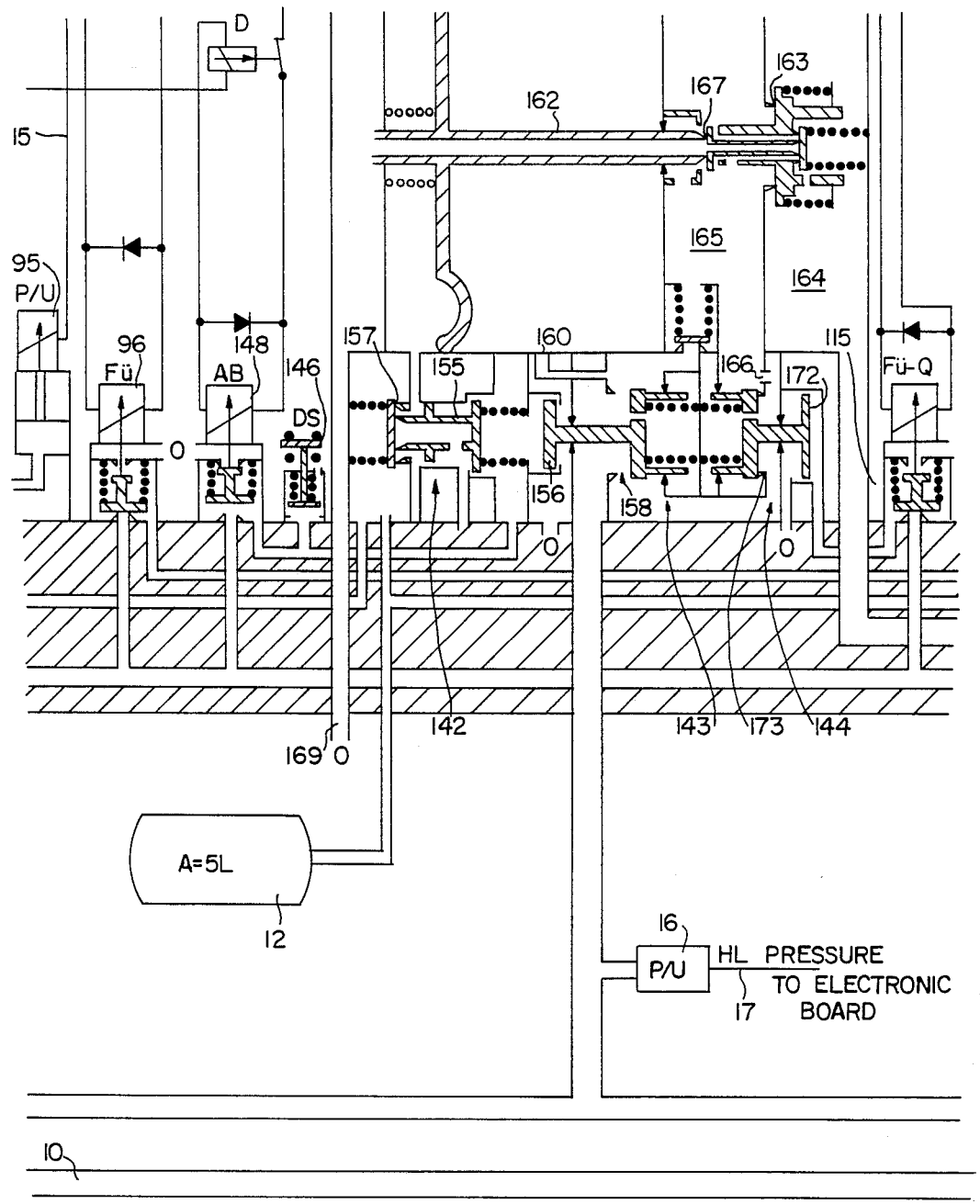
Figure 8K:
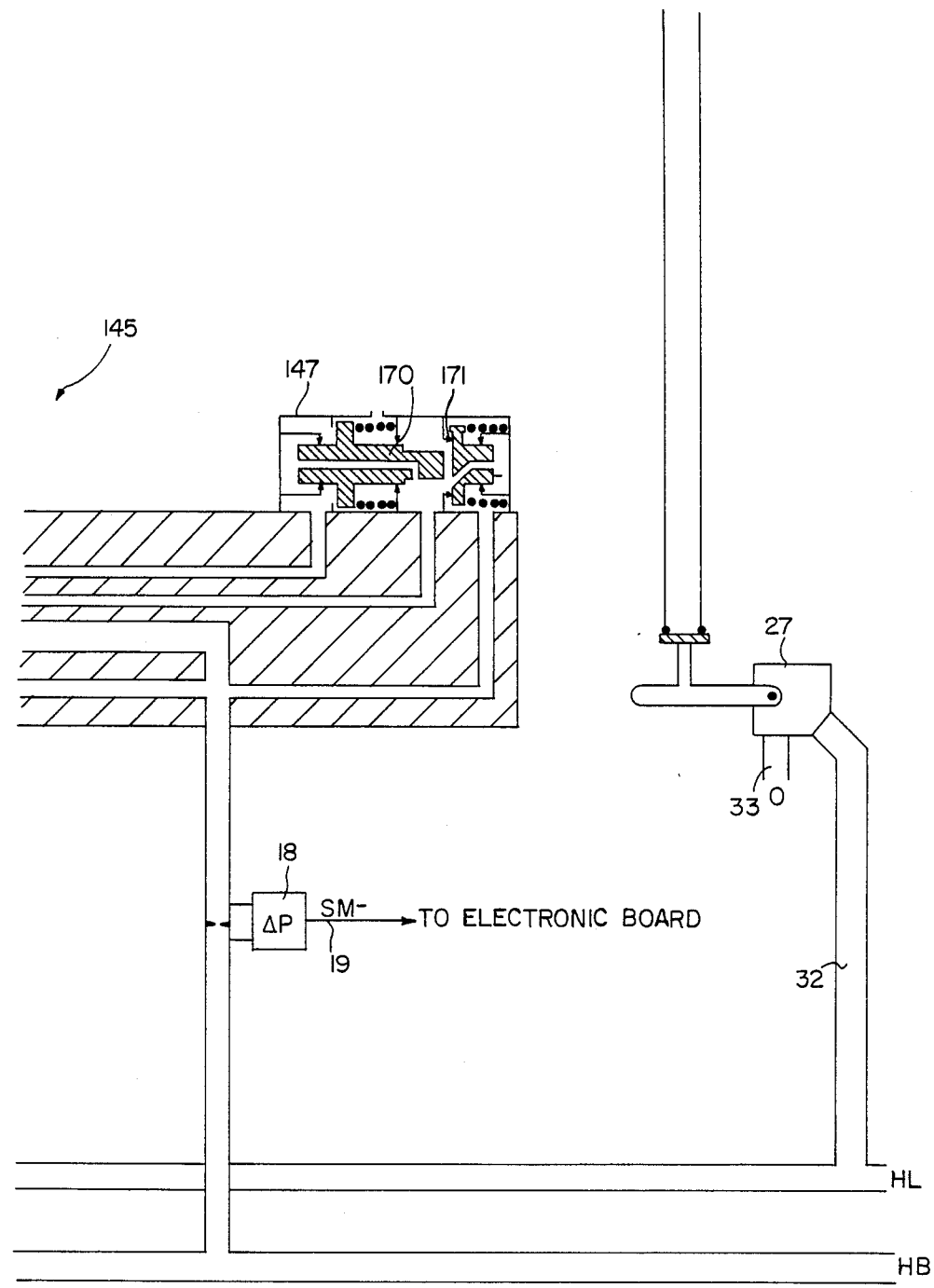

For the purpose of clarification of FIG. 8,

FIGS. 8A to 8I and 8K show excerpts from FIG. 8, in an enlarged scale;

If FIGS. 8A to 8I and 8K are lined up in sequence, the FIG. 8L result will be the complete FIG. 8 in an enlarged scale.

All details and labels will be clearly recognizable in such an enlarged, compiled FIG. 8.

Figure 10:
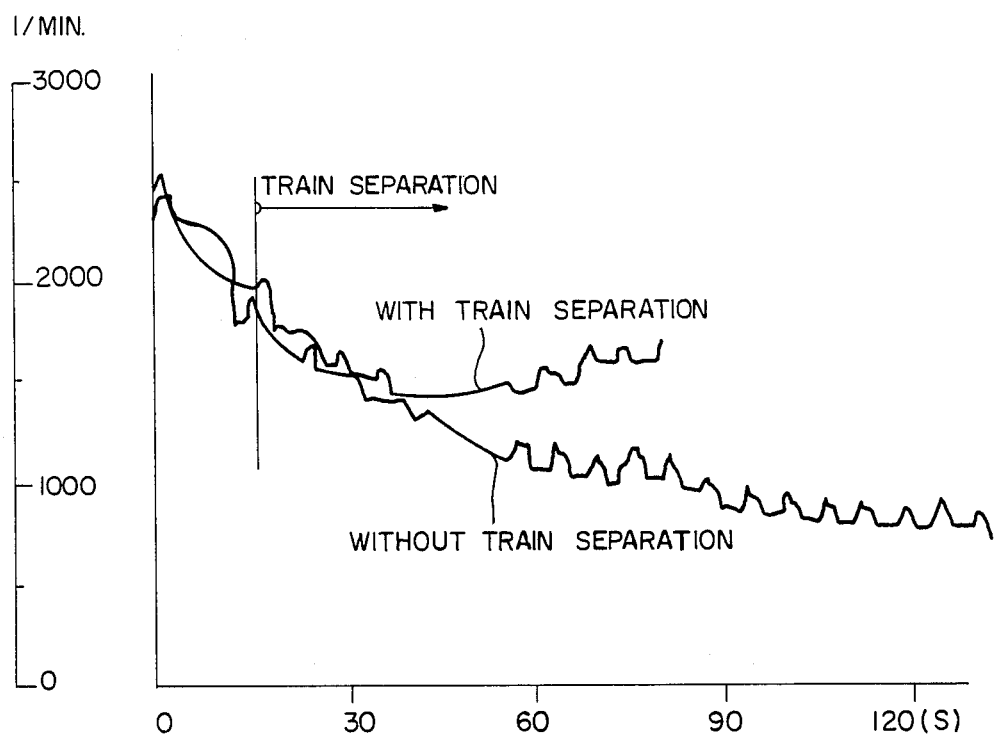
Figure 11:
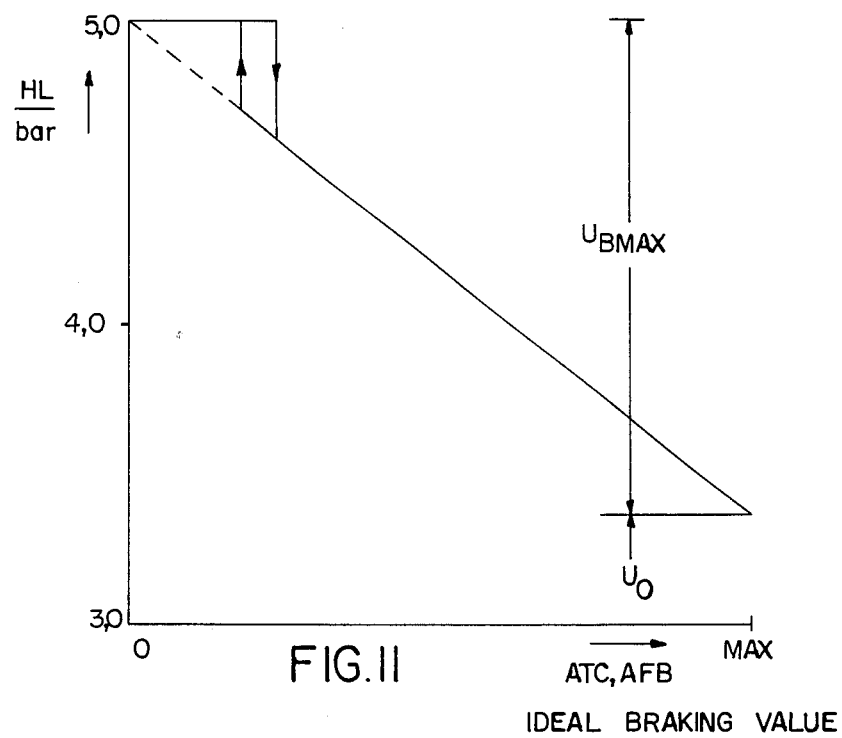
Figure 12:
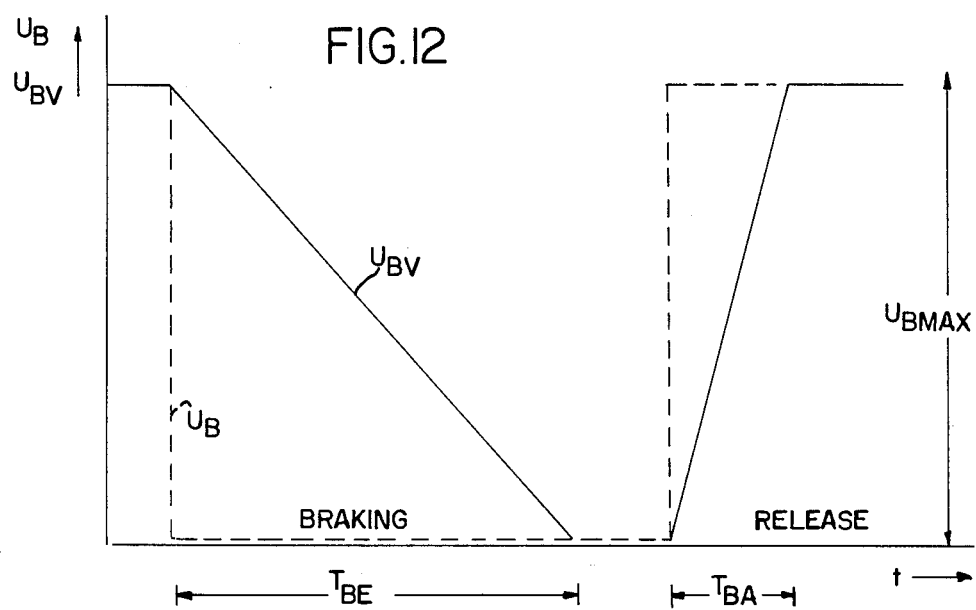
Figure 13:
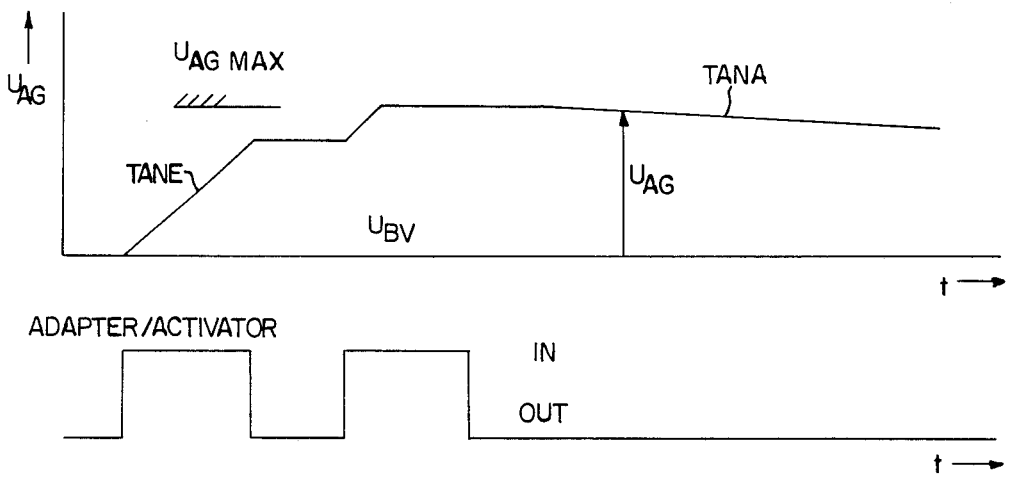
Figure 14:
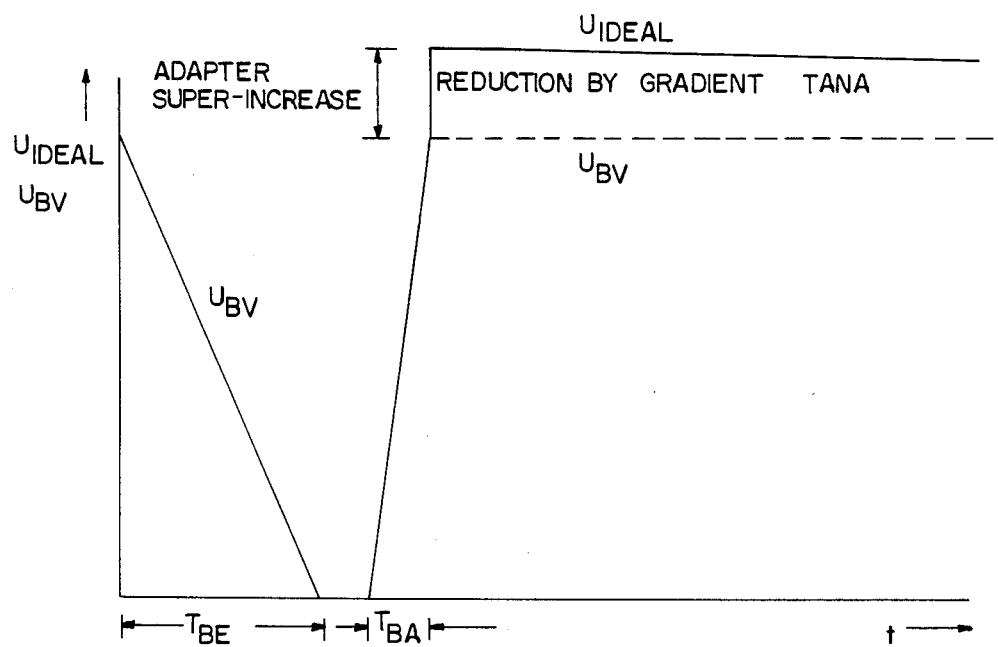
Figure 15:
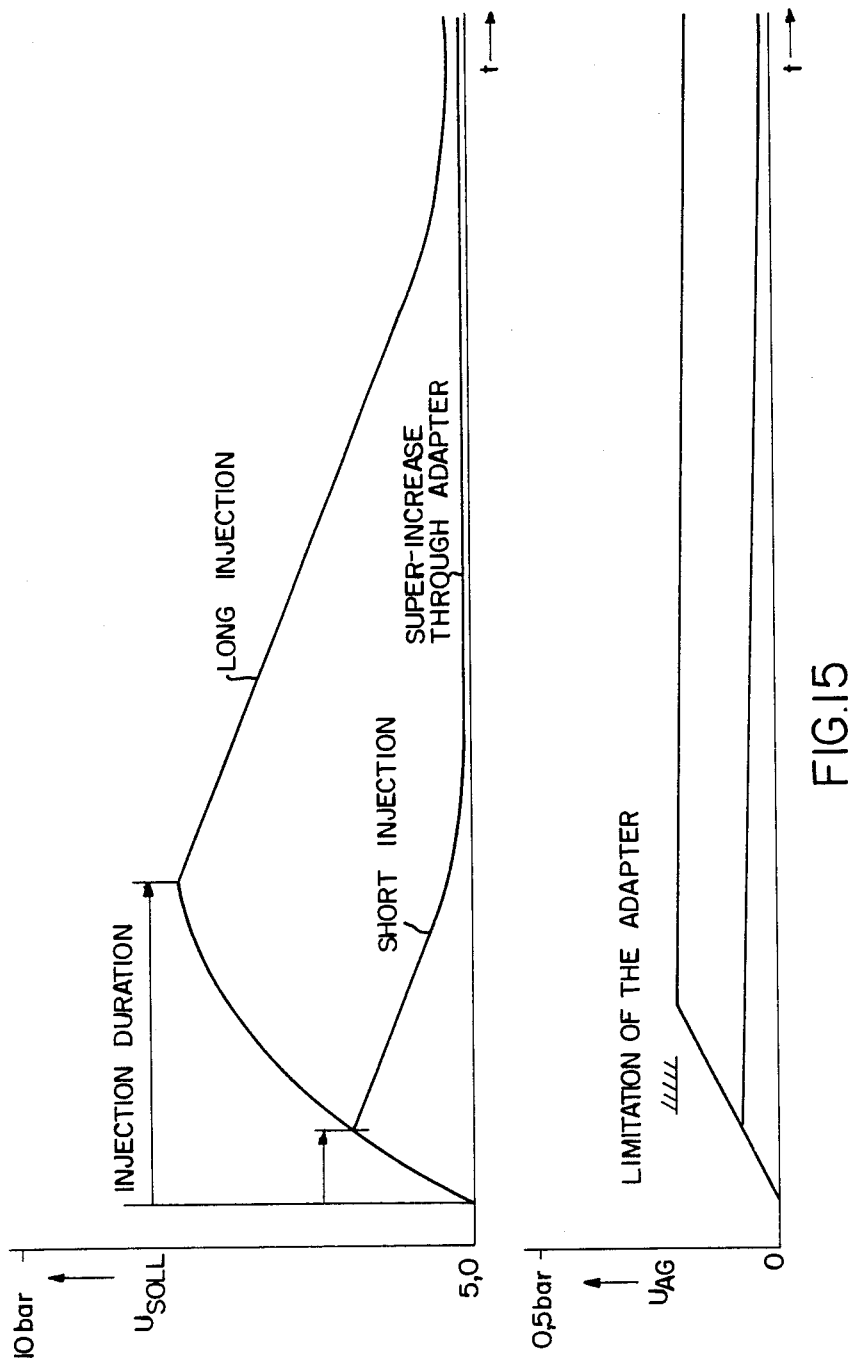

FIGS. 9A to 9C show a table of logical conditions of the input units, as well as the function implemented in dependence upon these conditions;

FIG. 10 is a time diagram of the mean flow-through through the HB line, for clarification of the "ascertainment of train separation" function;

FIG. 11 show the assignment of the HL pressure to the ideal brake value (including start-up behavior);

FIG. 12 shows the chronological progress of the gradient-limited ideal pressure value during braking and release;

FIG. 13 shows the chronological progress of the ideal super-pressure in manual adaptation;

FIG. 14 shows the chronological progress of the ideal pressure value of the automatic adaptor at full-braking and release; and FIG. 15 shows the chronological progress of the ideal pressure value and the adaptation value during injection.

Identical or corresponding parts in the various figures are identified by the same identification symbols.

DESCRIPTION OF PREFERRED EMBODIMENTS

The driver brake valve according to the invention reproduces the function of traditional pneumatic driver brake valves, with electronic means. The driver brake valve basically consists of an electronic servo-circuit for the creation of the servo-pressure (A-pressure) and a pneumatic effective part. One driver brake valve is provided per locomotive, and can be controlled from two control stations, FSA and FSB. Additional operation is possible by means of AFB and ATC control signals. Thus, the driver brake valve is suitable for automatic driving and braking as well.

Reference will first be made to FIGS. 1 to 4. An input unit 1 has the following subgroups:

Reference numeral 2: Input unit of a control station A;

Reference numeral 3: Input unit for a control station B;

Reference numeral 4: Input unit "AFB," of an automatic driving and braking control; and Reference numeral 5: Input unit "ATC" (automatic train control).

The output signals of the input unit 1 are passed on to an electronic board 6 (cf. particularly FIG. 5), in which an electrical signal for a desired value of the servo-pressure — hereinafter referred to as "A pressure" — is ascertained, which is then passed on to an electropneumatic converter 7 by means of a line 14. The output of the EP converter 7 is formed by a pneumatic control line 8, which transfers pressure medium under A pressure. This A pressure is passed on to a relay valve 9 of basically conventional construction, causing the pressure of a main air line — hereinafter called "HL" — to be set, in a conventional manner. The relay valve 9 is connected in a conventional manner to a main container line — hereinafter called "HB line" — by means of which the backfeed with pressure medium is achieved. In addition, the relay valve is connected to an A pressure container 12, and, finally, is provided with a vent 13 to the atmosphere.

In the EP converter 7, a pressure receiver for the A pressure is also provided, which passes an electrical signal corresponding to the A pressure through a line 15 of the electronic board 6.

As indicated in dash lines, the EP conveter 7, the relay valve 9 and the A container 12 are constructed in such a way as to form a single unit.

Figure 2:
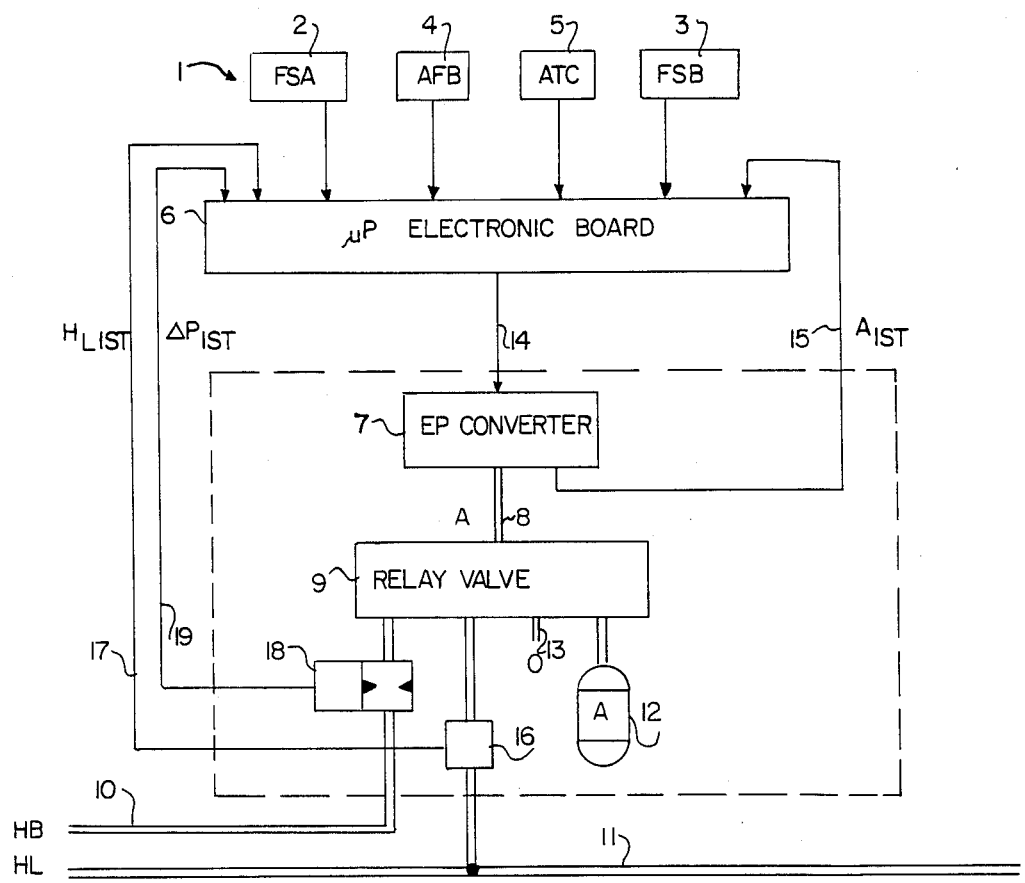
FIG. 2 is a diagram similar to FIG. 1, with a further development of the driver brake valve, according to the invention.

FIG. 2 contains a modification by means of which the HL pressure in the line 11 is ascertained by means of a pressure-voltage converter 16 and reported to the electronic board 6 by way of a line 17. In addition, the pressure medium flow in the HB line 10 is ascertained by a flow sensor 18 and reported by way of the line 19 to the electronic board 6. An apperture in the HB line is provided to serve in a particularly simple manner as a flow sensor 18, at each side of which a pressure probe is installed, the difference in pressure $\Delta P_s$ of the two pressure probes being a measure of the quantity of flow medium flowing past the aperture per unit of time. However, other types of flow or air quantity sensors may be used.

Figure 3:
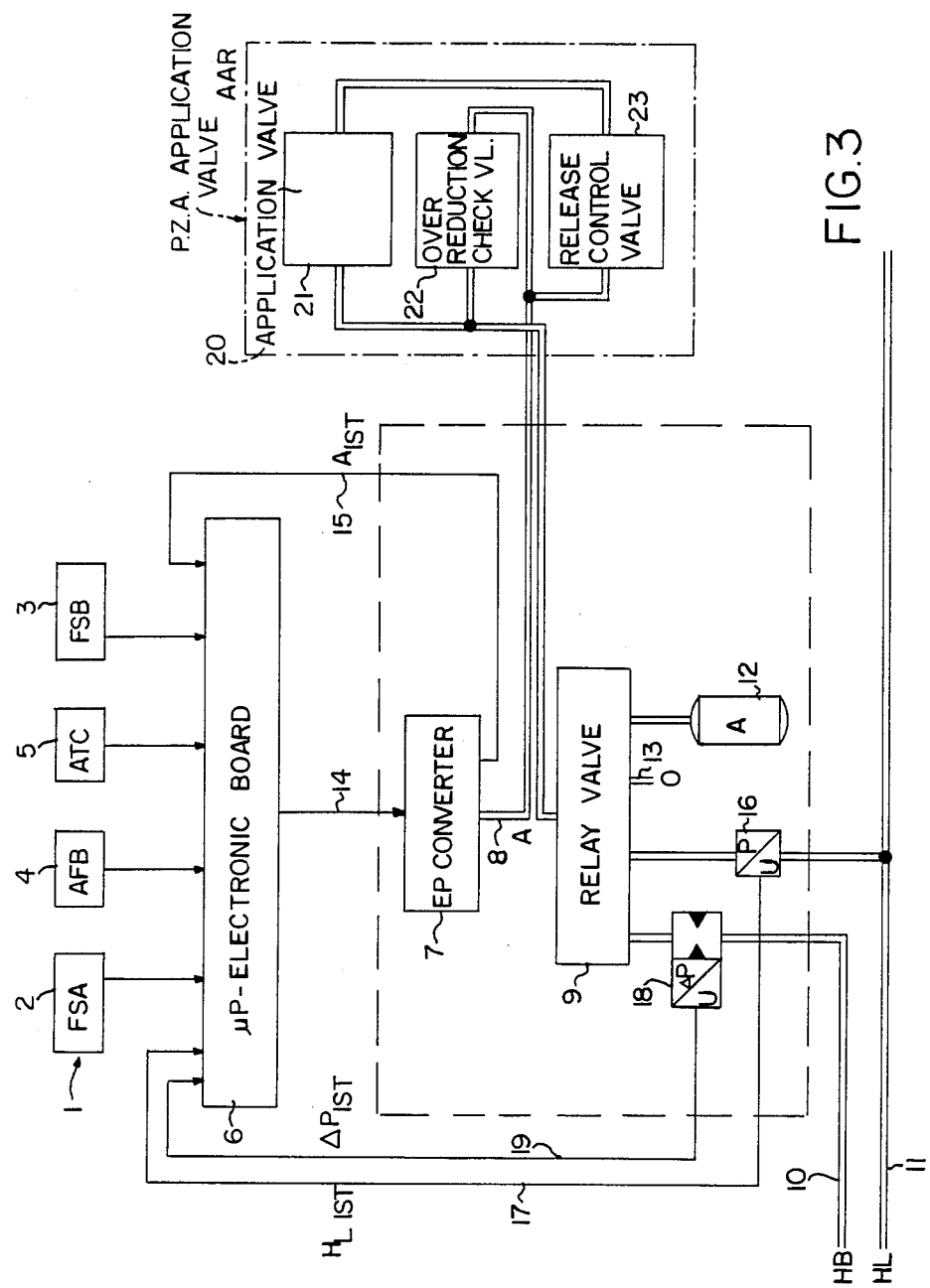
FIG. 3 is a diagram similar to FIG. 2, with a modification to meet U.S. standards (AAR)

FIG. 3 shows a modification of FIG. 2 in adaptation to the U.S. requirements of the AAR (American Association of Railways). By means of this modification, the driver brake valve can also be utilized in correspondence with the AAR standards. According to this standard, the A pressure not only has the function of a stabilizing control pressure, but is also a component of a safety philosophy. For this purpose, there is no direct connection between the A pressure regulator (here, the electronic board 6 with the EP converter 7) and the relay valve 9. Rather, control mechanisms are interpolated on the vehicle side of the A pressure line 8, which, for instance, vent off the A-pressure toward zero in a forced braking situation, and only in that way bring about a direct venting of the HL line into the relay valve. According to the AAR standard, the A pressure occurs not only in the relay valve; rather, there exists an outgoing and a return line to each of the other control mechanisms 21, 22 and 23. Specifically, the A pressure passes from the EP converter 7 to two control valves 22 and 23, and from there through the valve 22 directly to the relay valve 9, or through the valve 23 to a valve 21 and from there to the relay valve 9.

Figure 4:
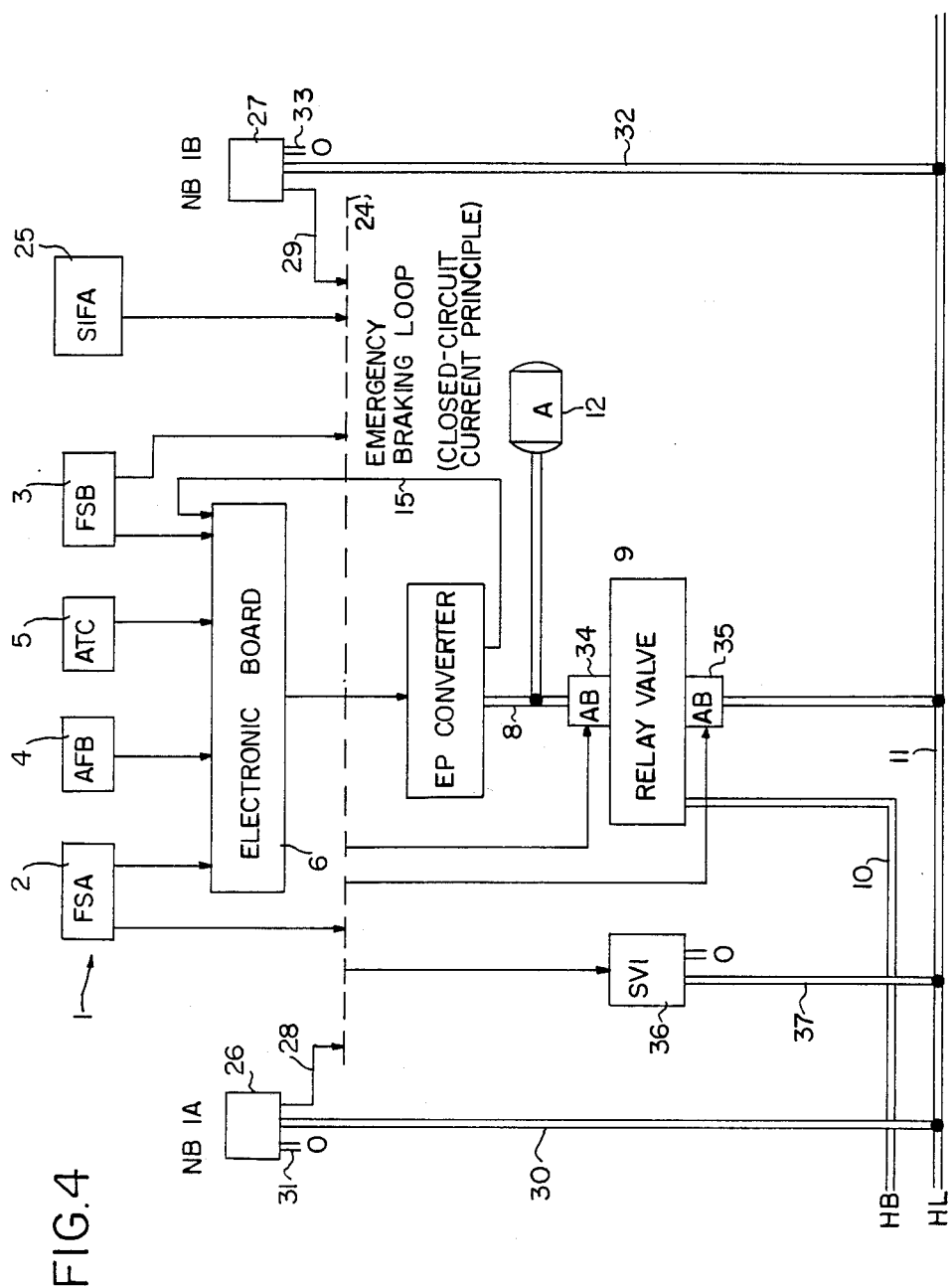
FIG. 4 is a diagram similar to FIGS. 1-3, with the supplemental attachment of an emergency braking loop.

FIG. 4 shows a further modification with the emergency braking-loop 24, which operates according to the closed-circuit current principle. On the one hand, emergency brake valves 26 and 27 are installed at both control stations, and are connected with the main air line 11 by the lines 30 and 32, respectively, which line they vent directly to the atmosphere by way of the vents 31 and 33, respectively. When the emergency brake valves 26 or 27 are activated, electrical signals pass from the lines 28 or 29 to the emergency braking loop 24. In addition, signals can be given to the emergency braking loop 24 from the input devices 2 and 3 as well as from a SIFA switch 25. Depending on such signals, a shut-off valve 34 in the A pressure line 8 at the entry of the relay valve 9, as well as a shut-off valve 35 between the relay valve 9 and the main air line 11 are activated in order to switch off the relay vent 9 in case of an emergency braking, and to prevent a backfeed of pressure medium, respectively. Finally, electrical signals of the emergency braking loop 24 also affect a rapid-braking valve 36, which relieves the HL pressure to the atmosphere by way of a line 37 connected to the main air line 11.

FIG. 5, together with FIGS. 5A thru 5G, shows the core of the invention, namely, the electronic board 6 and the EP converter 7. The connection plan according to FIG. 5 clarifies the connection of the structural components according to FIGS. 5A through 5G. When the FIGS. 5A through 5G are connected to the correspondingly-designated connections a1 through a37, a complete block diagram of the electronic board and of the EP converter is obtained.

The connections of the power supply are not specifically represented in FIG. 5; the same is true of the connections of the "Error Indication" card. The error signals indicated by "F" and an index number are passed on to the connections on the card according to 5G which are indicated by the corresponding designations.

Figure 5A:
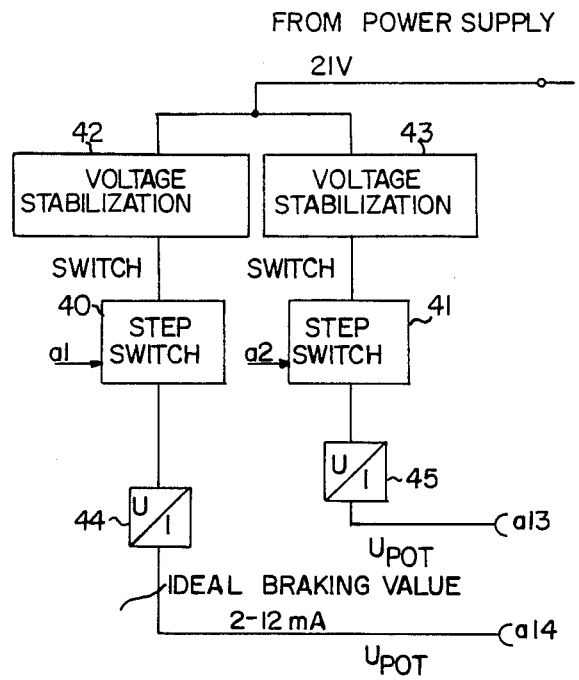
FIGS. 5A to 5G are wheel-lock switch images of individual structural components of the electronic portion of the driver brake valve, according to the invention.
Figure 5F:
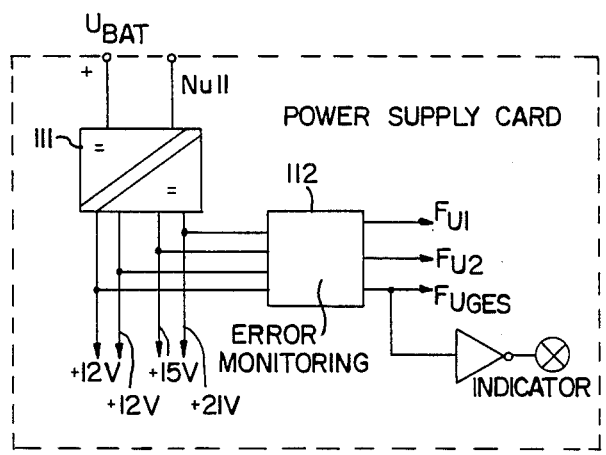
Figure 5B:
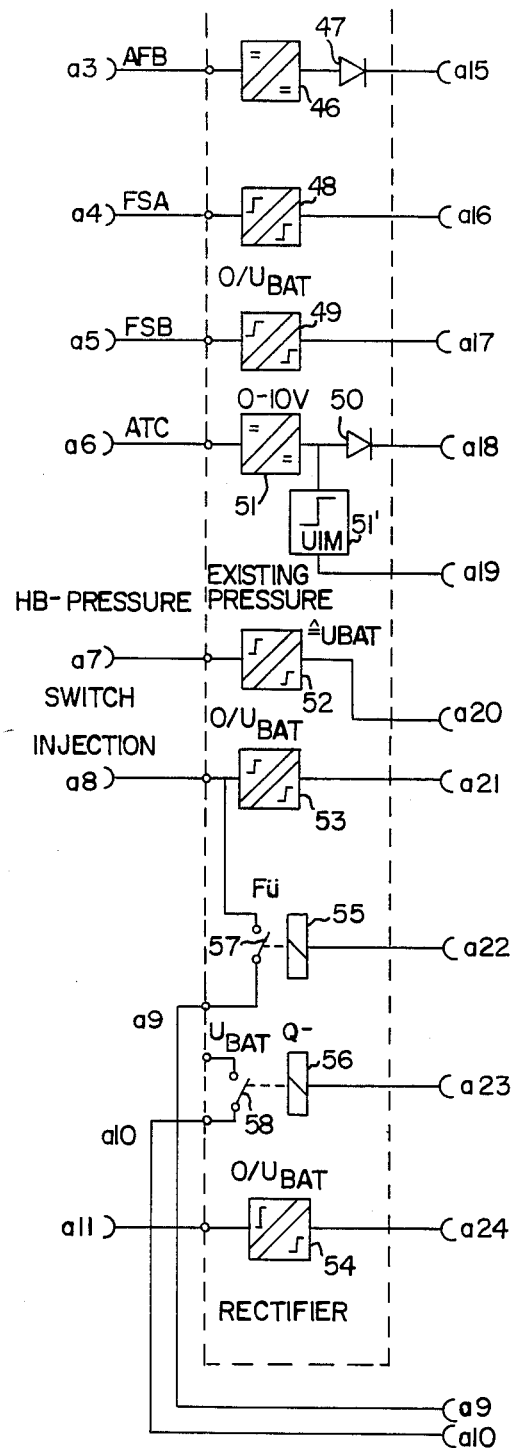

The electronic board consists of the following main groups:
 operational braking input (FIG. 5A);
 signal input for (galvanically separated) assumption of the other input signals (FIG. 5B);
 card for ideal value formulation (FIG. 5C); and
 card for adaptation and injection functions (FIG. 5D), which together constitute the actual logic for the reproduction of the function of the driver brake valve;
 EP-converter card (FIG. 5E) for very exact, proportional voltage-pressure conversion of output signals of the logic into A-pressure, which is then converted by the relay valve to HL pressure. The EP conveter includes an electro-pneumatic part with an inflow and outflow magnetic valve, pressure probes for ascertainment of the servo pressure A and the HL pressure, and also, in modification of the invention, a differential pressure probe or flow sensor for ascertainment of the volume flow of the HB line.
 Error indication card or memory (FIG. 5G).
 Power supply card and error indication (FIG. 5F.)

Each of the command consols 2 and 3 sends the following:
An analogous desired pressure value $U_{POT}$, which is emitted through the step switches 40 and 41, respectively (which may also be constituted as potentiometers or signal emitters which generate signals which differ over time, depending on the length of time that the key is activated). The step switches 40 and 41 are connected by way of voltage-stabilization switches 42 and 43, respectively, to the power supply (here, connection for 21 V) of the "Power Supply" card, according to FIG. 5F. The exits of the step switches 40 and 41 are converted to power values by means of the voltage transformers 44 and 45, respectively, and are emitted as "$U_{POT}$" signals to the connections A13 and A14, respectively. These connections are connected to the similarly identified connections A13 and A14, respectively, of the "Desired Value Formulation" card, according to FIG. 5C. The connections a1 and a2 of FIG. 5A here represent a driver brake lever operated by the train engineer.

Additional signal inputs are passed on to the "Signal Input" card according to 5B. This includes the following signals:

The AFB (automatic drive and braking control) at the a3 connection, as an analogous power or voltage value, which appears at the connection a15 by way of a galvanic decoupling 46 and a diode 47, which, together with a diode 50, serves the purpose of maximum value exchange.

The digital control signals FSA and FSB (for the connections a4 and a5, respectively), for distinguishing between the command consols. These signals are passed on to the connections A16 and A17, respectively, by way of the galvanic separators 48 and 49, repectively.

An analogous power or voltage value "ATC" of the automatic train control (A6 connection), which appears at the a18 connection by way of a galvanic separator 51 and a diode 50. The connections a15 and a18 are connected to one another, and also with the connection a18 of the "Desired Value Formulation" card (FIG. 5C), in such a way that the greater of the two signals AFB and ATC arrives there.

For the injection function to be elaborated on below, the output signal of the galvanic separator 50 is emitted to the connection a19 by way of a threshold-value switch 51.

At the connection a7 there is a signal from an HB pressure switch which indicates whether the HB, pressure has reached a certain value. This signal is passed on to the connection a20 by way of a galvanic separator 52. A injection signal from a key or switch on the control station is present at the connection a8, and is passed on to the connection a21 by way of a galvanic separator 53. In a similar manner, a signal from a key for an adaptation function is present at the connection a11, and is passed on to the connection A24 by way of a galvanic separator 54. In addition, the "Signal Input" card contains a relay 55 (injection relay) as well as a relay 56 (cross-section exchange relay) which are activated by signals at the connections A22 and A23, respectively. The relay 55 activates a switch 57, which connects the connections a8 and a9 with one another. The relay 56 activates a switch 58, which connects the connection a10 with the battery voltage $U_{BAT}$.

The transfer intersection points are so designed that in case of interruption of the signal (e.g., due to a break in the line), a reliable desired brake value is automatically output. Thus, in case of a break in the line, the following values result:

$U_{POT}$: Max. voltage;
ATC: Max. voltage;
AFB: Max. voltage;
Adapter: no signal;
Injection: no signal;
Control station switch: (FSA, FSB) no signal.

The same is true for important connections between the individual cards, for instance for the desired pressure value $U_{IDEAL}$ of the "Ideal Value Formulation" card (analog converter).

Figure 5C:
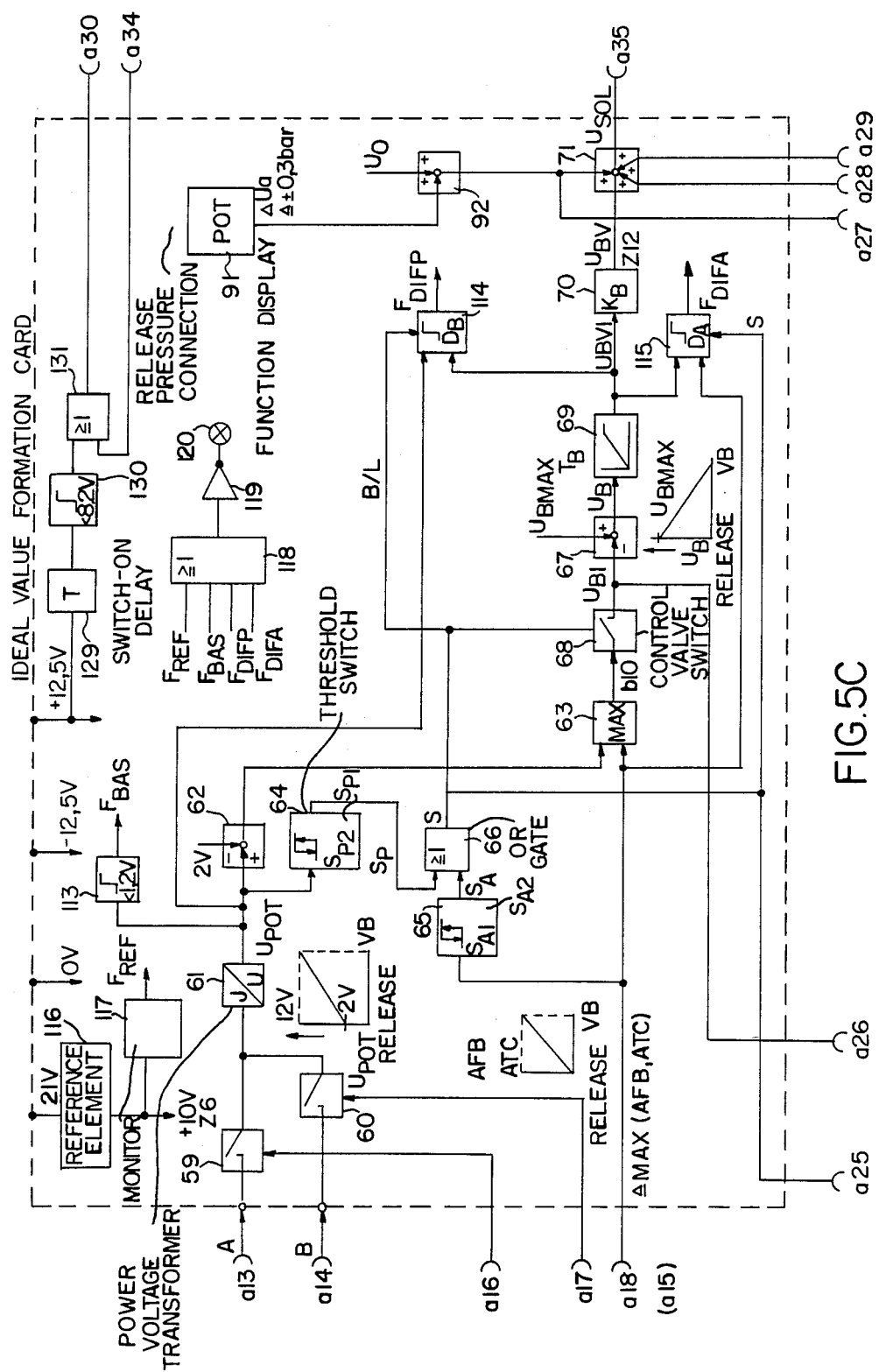
Figure 5D:
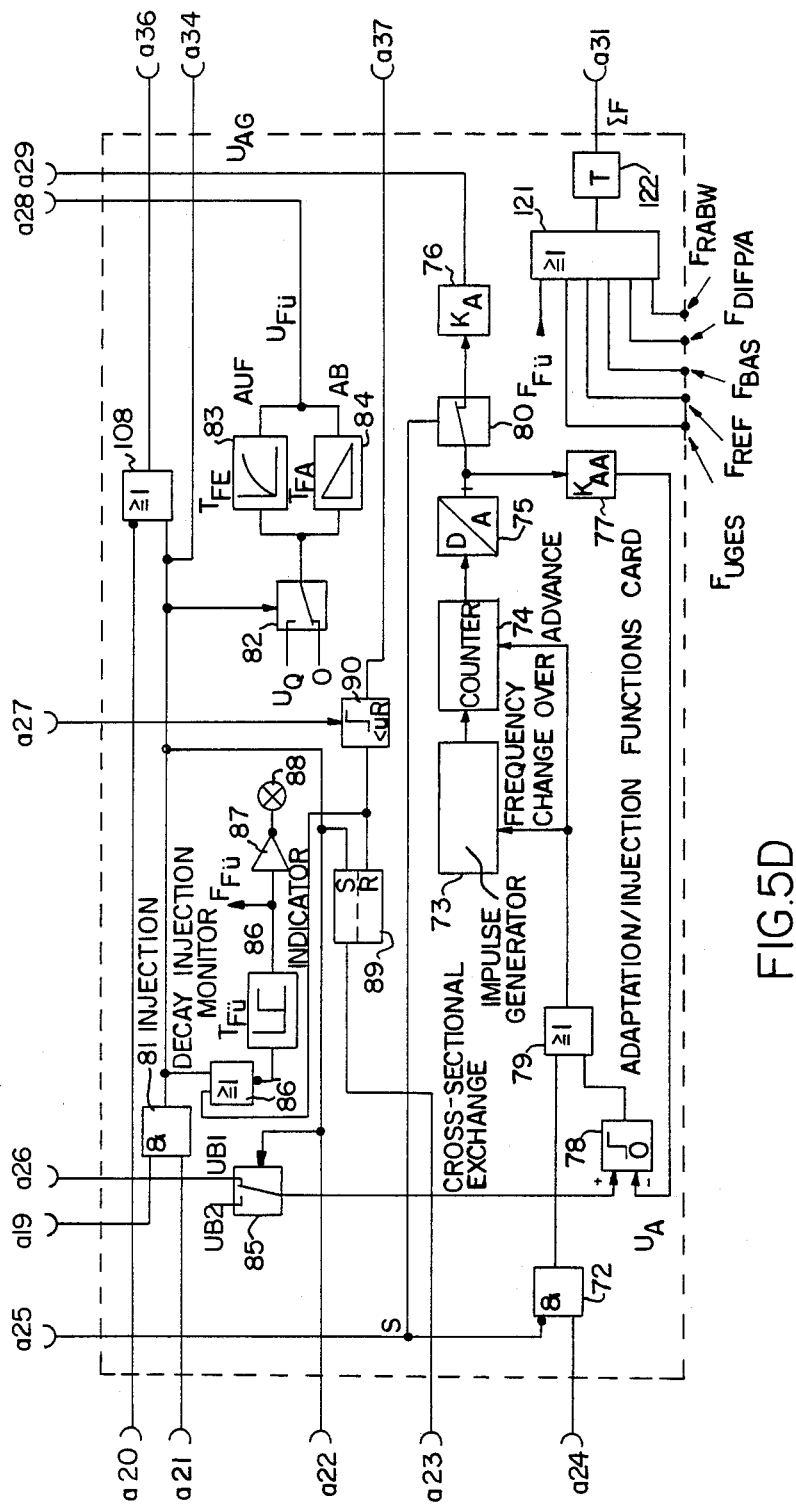
Figure 5E:
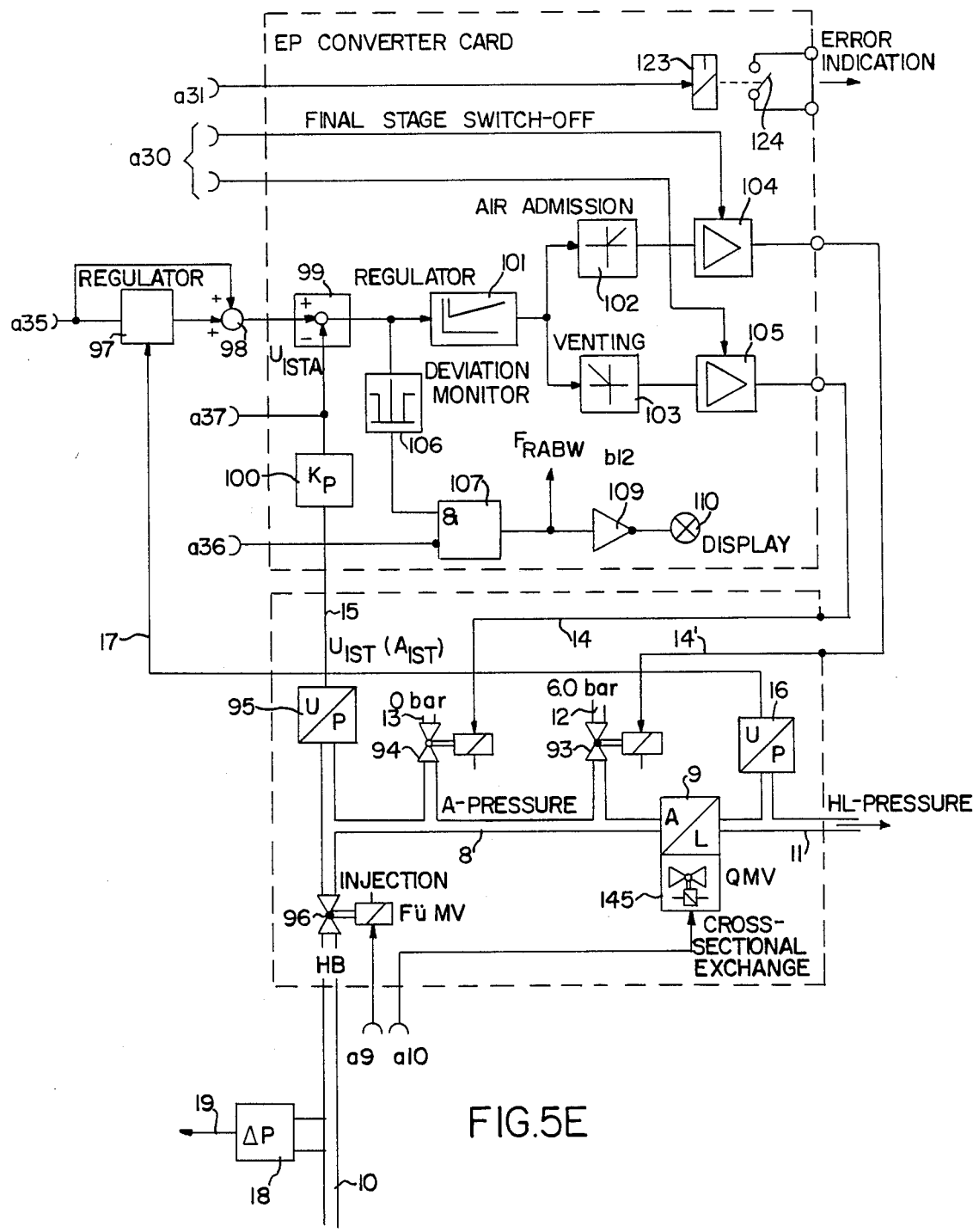
Figure 5G:
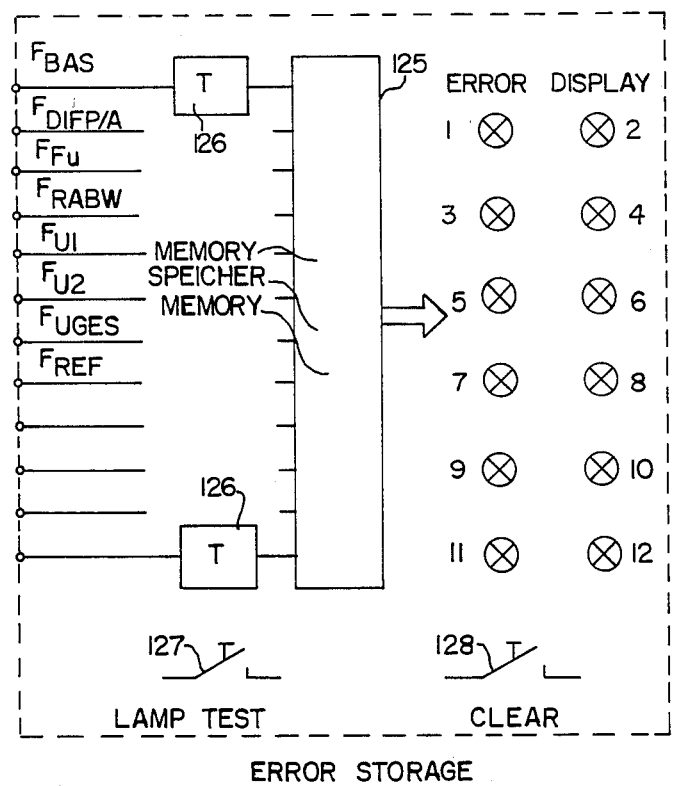

The actual logic according to FIG. 5C and 5D contains the four analogous desired braking values as its input signals from the control stations A and B, a well as from ATC and AFB (connections a13, a14, a15, and a18). In addition, there are digital signals for distinguishing the control stations (a16, a17), for injection (a21), adaptation (a24) and the availability of HB pressure (a20). By processing these signals, a desired pressure value $U_{IDEAL}$ (a35) is formed in the result, which is transformed to servo-pressure A by the EP transformer (FIG. 5E). An injection valve and a cross-section exchange valve of the relay valve cross-section are switched by way of the relay exits (a9 and a10, respectively) (FIG. 8).

Hereinbelow, the formation of the desired pressure value $U_{IDEAL}$ will be explained by reference to the FIGS. 5C and 5D. The analogous braking signals (connections a13 and a14) are passed to a power-voltage transformer 61 by way of controlled (FSA or FSB) signals to a16 and a17, respectively) switches 59 and 60, respectively, of which only one can be closed; there, the output signals of the voltage-power transformer 44, which or (1), (FIG. 5A) respectively, which are in the range between 2 and 12 mA, are transformed into the signal $U_{POT}$. The desired braking values have a basic signal component, so that the signal transmission of step switches or POTi 40 and 41, respectively, to the electronic board can be monitored. The positive assignment of braking power to signal voltage was selected for reasons of exactness, since the tolerance for the release pressure is less than with inverse signal characteristics. After subtraction of the basic signal in a subtractor 62, a maximum value exchange of all braking power request signals occurs in a maximum value selection circuit 63. The other entry of this circuit 63 carries the maximum value of AFB or ATC (connections a18 and a15). Thus, the brake power request signal is present at the exit of the circuit 63. The signal zero corresponds to the released state (HL=5.0 bar), while the maximum signal corresponds to full braking (HL=3.4 bar −0.2 bar).

A start-up behavior is achieved by means of the hysteresis thresh-old-value switch 64 for the ideal brake value and switch 65 for AFB, ATC; with the threshold values $S_{P1}$ or $S_{P2}$, and $S_{A2}$, respectively. With the utilization of a step switch (40, 41), the start-up value corresponds to the first brake step of the step switch. The values of $S_{P1}$ and $S_{P2}$ are slightly distorted, so that no interference with the electronic start-up device can occur, which means that the values of the step switch are dominant. The threshold values $S_{A1}$ and $S_{A2}$ electronically act upon a start-up behavior for the stepless ATC and AFB input signal, which corresponds to the start-up behavior of the step switch. If the desired braking value becomes continuous, if, for instance, it is output through a potentiometer (40, 41), the start-up will be defined by the values $S_{P1}$ and $S_{P2}$. The signals $S_P$ or $S_A$ cause the desired value, below the first braking stage, to be set to zero, so that the subsequent inversion (inverter 67) causes the maximum signal $U_{Bmax}$ of the release condition to be output.

For the concrete realization of the start-up behavior, the output signal $U_{POT}$ of the power-voltage transformer 61 is passed on to the hysteresis-threshold-value switch 64, while the maximum signal of AFB or ATC (connections a18 and a15) are passed to the hysteresis threshold-value switch 65. The exits of the threshold-value switches 64 and 65 are connected with one another by means of an OR gate 66, the output signal of which activates a control-valve switch 68 which is intermediate between the maximum value exchange circuit 63 and the inverter 67. The inversion in the inverter 67 occurs by having the output signal of the circuit 63 subtracted from a voltage $U_{Bmax}$. The static signal chracteristic, i.e., the HL pressure dependent on the ideal braking value $U_B$ at the exit of the inverter 67, is represented in FIG. 11. This signal is limited in its increase and decrease gradients to a time frame $(T_B)$ 69, as shown by the signal progression of FIG. 12. The braking time $T_{BA}$, which is given according to UIC, is especially important in this regard. The gradient-limited signal $U_{BV1}$ is normalized in a multiplier 70 with a constant factor $K_B$, or else adapted to the signal range, since further ideal value components from the adaptation and injection functions, which will be explained below, are also added. The normalized signal $U_{BV}$ is past to an integrator 71, where the final ideal value $U_{IDEAL}$ is generated according to the following relationship:

$$U_{IDEAL} = U_{BV} + U_O + U_{F\ddot{U}} + U_{AG}$$

The signals $U_O$ (basic value), $U_{F\ddot{U}}$ (desired value of the injection function) and $U_{AG}$ (desired value of the adaptation function) will be explained below.

The desired value $U_{IDEAL}$ appears at the connection a35 and goes from there to the connection a35 of the "EP transformer" card FIG. 5E), where it is transformed into a pneumatic servo-pressure.

Hereinbelow, the adaptation function, which is also performed fully electronically, will be explained. The superpressure which occurs during adaptation is electronically added to the desired pressure value $U_{IDEAL}$ in the integrator 71, and actualized by the EP transformer. Thus, the very slow pressure gradients need no longer be generated pneumatically by means of containers and nozzles, but rather can be actualized much more precisely by means of electronic time frames. The adaptation process can be performed manually or automatically.

The manual adapter can be activated from both control stationed by means of an "adapter" button ("ANE of FIG. 7), so that battery voltage is switched on at connection a11 as the control signal. This signal arrives first at the galvanic separator, then at the connection a24, and then at an AND gate 72, to the other inverted entry of which the output signal of the OR gate 66 (connection a25) is passed, so that it is ensured that this signal is only switched through in release setting; i.e., an adaptation activation in braking setting is not possible.

The adaptation function is performed digitally for reasons of precision, by means of an impulse generator 73, whose frequency is switchable, and whose exit signal affects a signal with timeproportional increase or decrease, dependent on the counting direction of the counter 74, in a series-connected forward backward counter 74 and a digital/analog-transformer 75. The counter 74 is switched so that an overflow at zero and at its ultimate value is prevented. With adaptation activation, the counter runs up within a time period of about 10 seconds. Without an adaptation signal, the counter automatically runs from the counted value position back to zero (Time: 240 sec. from maxium to zero). The counter position translated into an analog value (D/A converter 75) is assigned by means of a multiplier 76 to the maximum superpressure of the adaptation procedure (e.g., 0.5 bar), using a factor of $k_A$. The output signal of the multiplier 76 appears at the connection a29 and goes form there to an addition entry of the integrator 71.

The automatic adaptation function is derived from the magnitude of the braking which precedes it, so that during release, a super-increase of the release pressure occurs. The impulse generator 73 and the counter 74 are therefore switched parallel to a manual activation of a signal $U_{B1}$ minus $U_A$. The signal $U_{B1}$ is caught at the exit of the switch 68, and is proportional to the magnitude of the braking. The signal $U_A$ is generated at the exit of the D/A converter 75, multiplied (multiplier 77) by a factor $K_{AA}$. In a digital subtractor 78, the above-mentioned difference $U_{B1}$ minus $U_A$ is generated and passed on by way of an OR gate 7, whose other entry is connected with the exit of the AND gate 72, to the control entry points of the impulse generator 73 and the counter 74. Upon braking, the counter position is increased because of $>U_{B1} U_A$ (²) until $U_{B1} = U_A$ is achieved. The adaptation value $U_{AG}$, however, is not switched to be effective in the brake condition ($U_{AG}=0$). For this purpose, a controllable switch is provided between D/A converter 75 and multiplier 76, which is activated by the exit signal of the OR gate 66 (connection a25).

With step-by-step release, $U_A$ decreases (input subtractor 78) time-proportionately with the gradients given by the impulse generator 73. In the release setting, the remaining adaptation value $U_{AG}$ is switched through. This value is thus not only dependent on the preceding braking step, but also on the type of brake release.

With automatic adaptation, only a part of the increase of the manual adapter is given, which is taken into account by the factor $K_{AA}$ (multiplier 77). The chronological signal process with manual and automatic adaptation is represented in FIGS. 13 and 14.

Figure 7:
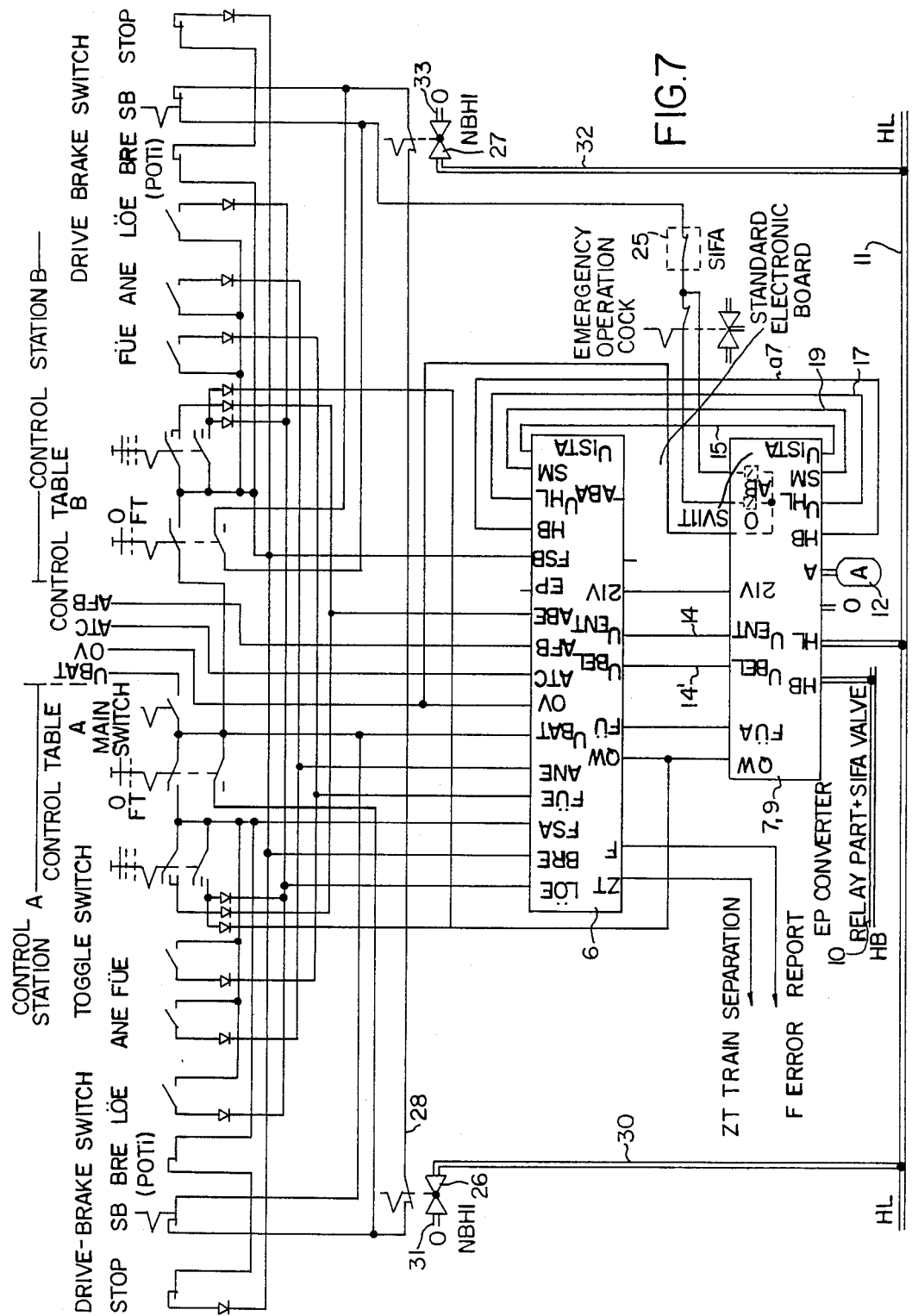
FIG. 7 is a further diagram of the driver brake valve according to the invention, with detailed representation of the input devices.

Hereinbelow, the injection function will be explained. The injection function occurs manually by switching on of battery voltage at the connection a8 by means of a key FÜE (FIG. 7). The injection command is only implemented if a braking order is not simultaneously present. For this purpose, the galvanically separated injection signal (connection a21) and the rapidly-checked ATC signal (connection a19) are passed through an AND gate 81. If, however, an AFB signal is present, it may very well be useful for the engineer to intervene with an injection, or for the AFB itself to make use of the injection function.

With the injection function at the exit of the AND gate 81, the injection relay 55 (FIG. 5B) is simultaneously activated through connection a22, causing the switch 57 to be closed and an injection magnetic valve (FIG. 5E) to be activated by means of a signal at the connection a9. In this way, the injection signal activates the injection relay 55, taking monitoring into account; a failure in relay 55 or in the electronic board causes the injection valve to be deactivated due to turning off of the injection signal; thus, injection is prevented.

With injection, the A pressure is set equal to the HB pressure by means of the injection magnet valve (FIG. 5E). The EP transformer is switched off by means of an internal signal, by interruption of the control for the braking and release magnet valve. (Exit of the AND gate 81, connections a34, a30 and final-step switch-off of the driver switch in the EP transformer for the braking and release valves). This is required since the desired pressure value $U_{IDEAL}$ cannot be set exactly at HB pressure, and the regulation would otherwise work against the HB pressure.

It is to be pointed out that the injection magnet valve 96 can also be omitted. In this case, the feed pressure to the A pressure container 12 must be increased to about 10 bar.

By means of the injection magnet valve, a very rapid increase of the A pressure in the relay valve is possible, faster than the EP transformer permits. After injection activation, on the other hand, a defined, delayed decrease of the A pressure is desirable, which can best be realized by the EP transformer. For that purpose, the desired pressure value $U_{IDEAL}$ is brought at injection to the lowest HB value (8 bar) by addition of the $U_{FO}$ (connection a28) in the integrator 71. This occurs by switching on of a specified value $U_Q$ to a controllable switch 82 the switch entry of which is connected with the exit of the AND gate 81. The value $U_Q$ is implemented by means of a delay mechanism 83 with the time constant $E_{FE}$. This delay mechanism 83 is only effective in the increase direction, and simulates the pneumatic delay of the A container during pressure increase, so that $U_{IDEAL}$ does not rush ahead of the A chamber pressure during the pressure increase. The output signal $U_{FO}$ of the delay mechanism 83 appears at the connection a28. This is significant at the end of the injection activation, since the delayed decrease of the super-pressure results from the value of the desired braking value $U_{IDEAL}$ which is present at that time. The chronological behavior of the pressure decrease is represented in FIG. 15 for short and long injection activation. With extended injection, $U_{IDEAL}$ achieves the maximum value (8 bar) and is decreased in linear chronological manner by a gradient $T_{FA}$ (e.g., 1.5 bar/4S), down to a value of 5.5 bar. This occurs by means of a time frame 84 which is switched parallel to the time frame 83 and is only effective in decrease. The ensuing transition to the adaptation value connected to the injection corresponds to an e-function. The time delay between 5.5 bar and 5.3 bar is about 5 seconds. All these values relate to the release pressure of 5.0 bar.

With the injection, an automatic adaptation activation results. For this purpose, the exit signal of the AND gate 81 is passed on to the control entry of a controllable converter 85, at the exit of which a given value of $U_{B2}$ appears, which is passed on to the positive entry of the digital integrator 78. The gradient of the superpressure corresponds to the general pressure adaptation procedure. The maximum value, however, is given independently of this, by the size of the value $U_{B2}$.

With short injection, $U_{IDEAL}$ remains far below the HB pressure, due to the delay mechanism 83, so that the A pressure at the injection end decreases very rapidly to the low ideal value, from which point it continues the process given in FIG. 15. The adaptation super-increase is correspondingly lower for a short injection.

The dissipation of the A pressure after the occurence of the injection is monitored. For that purpose, the time from the end of the injection activation (disappearance of the exit signal of the AND gate 81) is compared with a given time threshold $T_{F\ddot{U}}$ in a time frame 86. If the A pressure does not decrease within this period from, for instance, 8 bar to 5.65 bar, the error message $F_{F\ddot{U}}$ will occur, which is indicated by means of an amplifier 87 to a display 88. Between the exit of the AND gate 81 and the time frame 86, an OR gate is installed, the second entry of which is connected with the exit of the threshold value switch 90, which will be described below.

The injection signal is used to enlarge the effective backfeed cross section of the relay valve 9 by means of a cross section exchange magnetic valve (FIG. 5E, connection a10). For this purpose, the injection signal (exit of the AND gate 81) is switched by means of a setting entry of a flip-flop 89 to the connection a23, and activates the cross-section-exchange relay 56 (FIG. 5B), causing the switch 58 to deliver battery voltage $U_{BAT}$ to the connection a10, which in turn causes the cross-section-exchange magnetic valve (FIG. 5E) to be activated. This cross-section exchange remains in existence after the injection signal, until the A pressure of the pressure-voltage converter (signal on line 15; connection a37) passes below a threshold value $U_R$ of a threshold value switch 90, causing the latter to reset the flip-flop 89 (reset-entry). In this case, the threshold value $U_R$ could, for instance, be 5.65 bar.

In order to be able to adapt tolerances of differing structural elements (e.g., pressure probes, step switches), the possibility exists to correct the release pressure by ±0.3 bar. For this purpose, a potentiometer 91 (FIG. 5C generates a release pressure correction value $U_O$ which on the one hand is passed on to the intergrator 71 after addition (adder 92) to a basic value $\Delta U_O$, and on the other hand, is corrected by means of the connection a27 to the threshold value $U_R$ of the threshold value switch 90. All pressure threshold values which are processed in the electronic board automatically are changed with this correction.

The EP converter according to FIG. 5E consists of an electronic part with a regulating logic and a valve support, as indicated by the dashed lines in FIG. 5E. The valve support contains the relay valve 9 (including the cross-section valve), as well as the intake magnetic valve 93 and an outlet magnetic valve 94, both of which are connected to the A pressure line 8. The intake of the magnetic valve 93 is fed by a regulated pressure level exceeding the release pressure in the main air line 11, for example from a pressure-decreease valve 140 set at, for instance, 6 bar, as as shown in FIG. 8, while the outlet 13 of the magnetic valve 94 is connected with atmospheric pressure. The A pressure is measured by a pressure-voltage converter 95, and is emitted into the line 15 as an actual value signal $U_{ist}$. The above-mentioned injection magnetic valve 96 connects the HB line 10 with the A pressure line 8. In the HL line 11, i.e. at the exit of the relay valve 9, the pressure-voltage converter 16 is installed, which measures the HL pressure and emits it onto the line 17 as a voltage value. In the HB line 10, the flow-through meter 18 is installed, which is constituted here as a pressure difference meter which measures the pressure difference between two sides of an aperture installed in the HBN line 10, emits this pressure difference as a proportional voltage value to the line 19.

The electronic board of the EP transformer is constituted as a closed regulatory circuit, which permits an extreme linearity and precision of the EP transformation ($U_{IDEAL}$ to A pressure) to be achieved. Hysteresis is not present in the servo circuit. For reasons of stability of the pressure regulation, the servo pressure and not the HL pressure is regulated here, so that the overall hysteresis of the relay valve 9 remains effective. For the stability of the regulation, a minimal volume is necessary, which is obtained through line volume and volume of the relay valve 9. The A container 12 which enlarges this volume can thus theoretically be dispensed with. A volume expansion has no effect on the pressure gradients, since these are electronically given. However, it does nonetheless contribute an additional "clamping effect" to the regulation. In spite of the utilization of switching magnetic valves, an (almost) static and exact regulatory behavior is achieved, since the magnetic valves can be controlled in such a way that partial openings of the valves are also possible.

The desired value signal $U_{IDEAL}$ (connection a35) arrives at regulator 97, to the other entry of which the HL pressure measurement value is passed on by way of the line 17. The output signal of the regulator 97 and the value $U_{IDEAL}$ (connection a38) are added in an integrator 98 and then passed on to a comparer 99, where a comparison between the output signal of the integrator 98 and the actual-value signal of the A pressure takes place. The output signal of the pressure-voltage converter 95 is then multiplied by the factor $K_p$ in a multiplier 100 before being passed on to the comparer 99. The exit signal of the comparer 99 is passed on to the regulator 101, the exit of which activates the magnetic valves 93 or 94 by way of the servo-detectors 102 and 103 respectively, and the amplifiers, 104 and 105 respectively (connection a30), which are turned off depending on the servo sign of the regulation deviation, which caused the A pressure to increase (magnetic valve 93) or decrease (magnetic valve 94).

The EP converter is monitored by evaluation of the regulation deviation (entry of the regulator 101) by means of a window discriminator 106. If the regulation deviation exceeds or is less than the specified threshold values, an error message $F_{RABW}$ will result. This error message only appears (AND gate 107) when a signal for existing AB pressure is present at the connection (cf. the signal at a7, galvanic separator 52, connection a20, OR gate 108 (FIG. 5D), connection a 36). By means of the OR gate it is also ensured that at injection (exit AND gate 81), the error monitoring is switched off. These measures are required so that no error message or error record in memory results from equipping of the vehicle (insufficient HB pressure). Since a deviation from regulation results from insufficient HB pressure, the error monitoring is turned off, depending on the setting of the HB pressure switch. The error signal $F_{RABW}$ made visible on a display 109 by means of an amplifier 110. By means of the error message, failure of the pressure sensors, the magnetic valves, the final steps and the regulator are ascertained. Since the amplifier 109 inverts, an error message is reported by deletion of the display 110.

The signal processing which leads to the formation of the desired pressure value $U_{IDEAL}$ is likewise monitored by a number of measures. This monitoring is designed particularly to prevent an unintentional release of the brake. These functions are explained as follows. First of all, the "Power Supply" card of FIG. 5F, which includes a network portion 111 fed by the battery $U_{BAT}$, has an error monitoring 112 for the individual supply voltages. For this purpose, threshold value switches are provided which generate the error messages $F_{U1}$, $F_{U2}$, and $F_{Uges}$. In this way, the regulated supply voltages for the step switch and the potentiometers 40 and 41, respectively, are monitored as well. If a value is not achieved, an error message results; for $F_{Uges}$, a negating amplifier and an indicator lamp are represented for this purpose.

By monitoring of the basic portion of the ideal braking value $U_{POT}$ (output power-voltage transformer 61) in a threshold value switch 113, a failure of the brake-request signal due to error in the step switch and/or the potentiometer can be recognized. This failure causes an error message $F_{BAS}$, which, however, does not cause an automatic brake activation.

By means of the error messages $F_{DIFP}$ and $F_{DIFA}$, sequential signal-processing components such as the time frame 69 are monitored. In a comparer 114, a difference between the brake-request $UP_{OT}$ (power-voltage transformer 61) and the value $U_{BV1}$ (time circuit 69) is formulated, which is retrieved in each case at the beginning and at the end of a signal processing. The monitoring, in this case, is designed to recognize whether the susequent signal erroneously deviates in the direction of release. During monitoring, the differerentiation is made as to whether the desired value is above or below the first braking step, in order to distinguish between braking and release. The required threshold for monitoring is less in the braking range (e.g., 0.15 bar) than in the release range (e.g., 0.55 bar), since differences in the release range are greater due to transition to the first braking step. For this purpose, the comparer 114 is switchable as regards its threshold value, by means of the output signal of the OR gate 66. With the error message $F_{DIFP}$, the desired braking value is used as the comparison signal; with the error message $F_{DIFA}$ (comparer 115), on the other hand, the AFB or ATC signal is used, and is compared to the signal $U_{BV1}$ (time circuit 69). Here, too, a switch-over of the threshold value occurs by means of the output signal of the OR gate 66.

For the purpose of monitoring of the step switch and/or the potentiometer-supply voltage, a reference element 116 is also provided, the voltage of which is monitored in a monitoring organ 117 which generates the error message $F_{REF}$. The error messages $F_{REF}$, $F_{BAS}$, $F_{DIFP}$ and $F_{DIFA}$ are in addition passed through an OR gate 118 and an inversion amplifier 119 and utilized for a function display 120, which is deleted when one of these errors occurs.

The monitoring of the injection (error message $F_{FI}$ (time circuit 86)) has already been explained above.

All the error messages mentioned with regard to FIGS. 5C and 5D are sent to the EP converter card through an OR gate 121 and a time circuit 122 by way of the connection a31, where they switch on an error message relay 123 and hence its switch contact point 124, which emits an error message.

In addition, all error messages are passed to an error memory 125 (FIG. 5G), in each case by way of the time circuits 126. There, error messages are stored and displayed on assigned error displays. The error memory according to FIG. 5G also has a key 127 for a lamp test, as well as a delete key 128. By contrast to the displays 88, 110 and 120, which light up in undisturbed operation and delete the errors, the error displays of FIG. 5G operate in positive logic, i.e., they light up when an error occurs.

The time circuits 126 ensure that errors are displayed and stored only if they have been present for longer than a prescribed time period (e.g., 3 seconds). A failure of the supply voltage and/or removal of the "Error Memory" card does not delete the stored information. Deletion is accomplished only by means of the delete key 128.

On the "Desired Value Formulation" card (FIG. 5C), a switch-on delay 129 for the final-step switch-off (amplifiers 104 and 105) is provided which sends a signal by way of a threshold value organ 130 and an AND gate 131 to the amplifiers 104 and 105 of the final-step switch-off when the supply voltage is switched on. As described above, the injection signal from the AND gate 81 is passed on to the other entry of the AND gate 131 by way of the connection a34.

FIG. 7 shows in more detail the switching connection of the input devices, with the electronic board 6. The abbreviations signify:
SB: Rapid braking;
BRE: Braking;
LÖE: Release;
ANE: Adaptation;
FÜE: Filling;
DICHT: Seal check;
BETR: Operational setting;
AUFP: Pumping up;
$U_{BAT}$: Battery voltage;
ATC: Automatic train control;
AFB: Automatic drive and brake control;
FT: Control pannel switched on;
$U_{BAT}$: Power supply (Battery voltage);
OV: Reference voltage O V.

The inputs to the electronic board 6 — to the extent that they agree with the above formulation — have the same meaning. In addition, the following inputs are provided there:
FSA: Control station A;

FSB: Control station B;
HB: HB pressure switch;
$U_{HL}$: Main air line pressure;
SM: Flow meter (18);
$U_{ISTA}$: A pressure;
ABE: Operational readiness switch (from toggle switch).

The designations utilized at the output connections of the electronic board 6 signify:
ZT: Train separation;
F: Error message;
QW: Cross-section exchange (at relay valve 9);
FÜ: Injection signal;
$U_{BEL}$: Control signal for air supply valve 93;
$U_{ENT}$: Control signal for ventilation valve 95;
21V: Power supply at 21V;

To the extent that lines in FIG. 5E are provided with a reference sign, this sign was also shown in FIG. 7. In the same way, the emergency brake handles 26 and 27 and the sifa key 25 are shown according to FIG. 4.

A handle for emergency operation with the shut-off valves "AB," analogous to the shut-off valves 34 and 35 in FIG. 4, is also shown.

To the extent that keys for the input units are represented, their function is easily comprehensible from the above designations and the explanation for FIG. 5. It is also obvious that the individual keys can generate signals only after they are connected to battery voltage $U_{BAT}$ by way of the main switch and the position FT of a closure of the corresponding control station (designation "control station A" or "control station B" in FIG. 7) as well as the position "BETR" of the toggle switch in the corresponding control station. The diodes represented on several keys serve as decoupling diodes.

For the generation of the braking signal "BRE", a key may be provided — as indicated in FIG. 7 — in which case the brake request signal increases as a function of the time period of the activation of the key. Of course, the potentiometers or step-switches 40 and 41, respectively can also be utilized here, according to FIG. 5A. As a special option, required by some railway administrations, the key "BRE" is located in a current loop with a switch which is identified here with the designation "Stopp", and is primarily used for rail-switching operations.

It can be seen from FIG. 7 that the emergency brake loop ($U_{BAT}$, main switch, both rapid-braking switches SB and keys of the emergency brake handles 26 and 27, respectively, lines 28) is constituted as a quiescent current loop which operates independently of the electronic board 6. If this quiescent current loop is interrupted at any point, the main air line 11 is vented by way of the emergency brake handles 26 or 27, and simultaneously the shut-off valves AB are closed by way of the Sifa 25. The remaining signal paths of FIG. 7 can easily be derived from the diagram, so that no detailed explanation is required.

Figure 6:
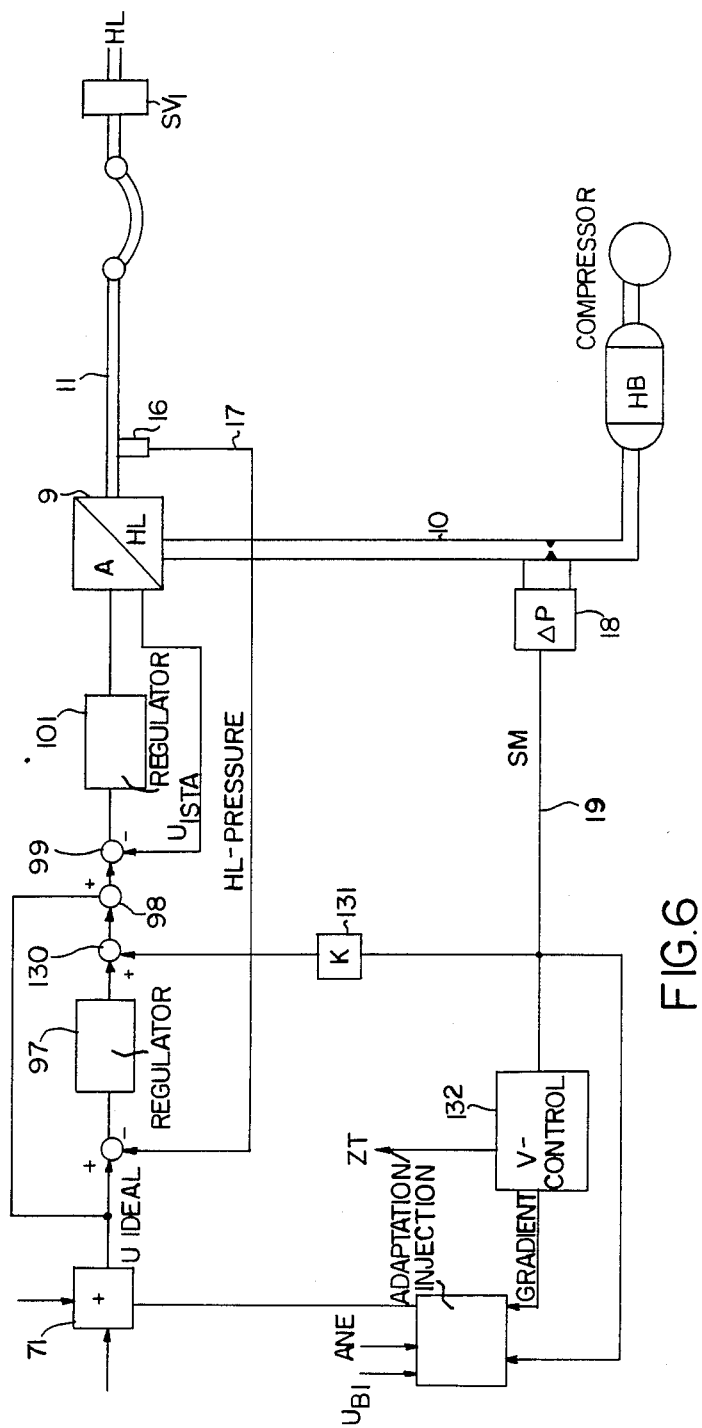
FIG. 6 shows a modification of the wheel-lock switch image of FIG. 5, with ascertainment of the backfeed effect from the HB line.

FIG. 6 shows a modification of the regulation electronic board, and especially how the signals for HL pressure and the flow-meter in the HB line are processed. The same identification designations as in FIG. 5 designate the same parts. Consequently, only the departures from FIG. 5 will be explained. Between the regulator 97 and the integrator 98, a second integrator 130 is switched in, in which the output signal of the flow sensor 18, which is present on the line, multiplied by a factor of k (multiplier 131), is added to the output signal of the regulator 97. In addition, the rate of change of the flow in the HB line is monitored and reported to the "adapter/injector" card (FIG. 5D). Likewise, the current actual value of the output signal of the flow sensor 18 is reported to this card. An output signal of this card is then additionally fed to the integrator 71.

The essential goal of these measures is to shorten the release time. For this purpose, the HL pressure is to a certain extent regulated to the release pressure at the first control valve (of the first rail car). The pressure probe 16 serves this purpose.

For these reasons, the flow meter is also used. The pressure difference in the flow meter $\Delta P$ is in a fixed relationship to the pressure difference in the HL line 11 between the HL pressure-measurement point 16 and the first control valve $\Delta P_{HL}$. The following formula applies:

$$\Delta P_{HL} = c \Delta P,$$

where c is a constant factor. Thus, the through-flow at the flow meter in 1/min need not be measured; rather, it is sufficient to process the pressure difference. If, in addition, $\Delta P_{HL}$ is added to the A pressure (adder 130 and 99), it is assured that the H1 pressure at the first control valve will quickly reach the regulation pressure of 5 bar plus the current value of the automatic adapter, and maintain it throughout the entire release phase. In this way, considerable release time improvements can be obtained. Information regarding train-length or train-weight is unnecessary. By taking into account the HL pressure and the pressure difference $\Delta P$ at the flow meter 18, the A pressure sustains a long-lasting super-pressure of up to 0.65 bar without danger of overloading the brake by way of the relay valve 9. The release time is thus considerably abbreviated, and corresponds to the proper time of the control valve.

For extremely long or heavy trains, the suggested measures for attaining a release time within the proper time of the control valve are sufficient. For trains with a greater air consumption, an improvement is achieved by raising the value of the automatic adapter or maintaining the initial value constant for a predetermined period. These measures can be independent of backfeed effectiveness $\Delta P$.

In addition, a train separation can be ascertained by means of and flow signal SM (line 19). As can be seen from FIG. 10, the backfeed effectiveness during release procedures decreases continuously, even with very long trains and/or possible lack of seal tightness of the HL line. In case of train separation, however, the backfeed effectiveness increases again after an initial drop-off phase, so that a clear distinction criterion between separation and filling exists. This can be monitored in the switch circuit 132, by comparing the gradient of the flow signal after a predetermined time period with a threshold value. Thereupon, the train separation signal ZT can be generated.

FIG. 8 primarily shows, in a diagrammatic sketch of the driver brake valve, the arrangement of the pneumatic operation part. Again, the same designations as in the other figures identify the same or corresponding parts. The basic components are:

An analog-converter with the release magnetic valve 93, the brake magnetic valve 94 and the pressure probe 95.

Figure 1:
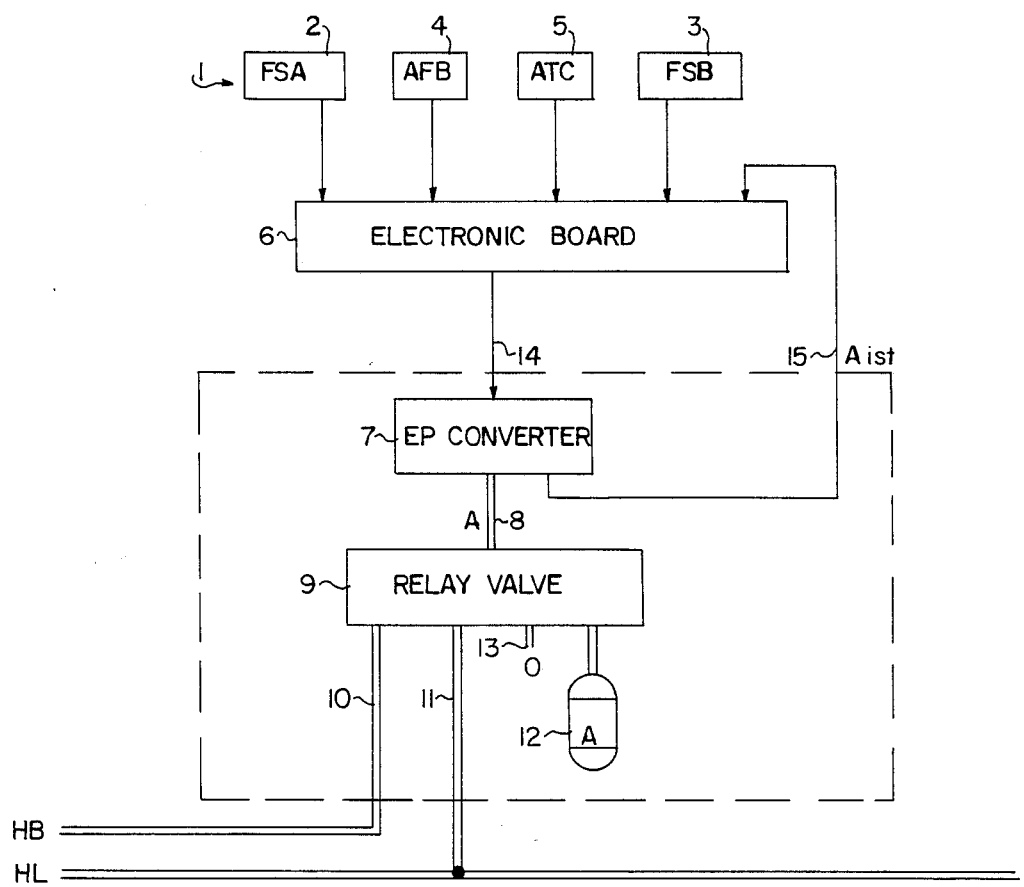
FIG. 1 is a block diagram of the driver brake valve according to the invention.

A pressure-decrease valve 140;
The servo-injection magnetic valve 96;

A pneumatic relay valve 141 (basically corresponds to the relay valve 9 of FIG. 1);

Pneumatic shut-off valves 142, located in the housing of the relay valve 141, for the servo-pressure A and 143, for main air line pressure HL and for the cross-section exchange valve 144;

The control pressure container 12 (volume, e.g., of 5 1);

The flow display or pressure difference meter 18;

The cross-section exchange magnetic valve 145;

A pressure switch 146 for monitoring the HB pressure; and

A pneumatic injection valve 147.

The regulation electronic board 6 electrically controls the magnetic valves 93, 94, 96, and 194, and for its part receives measurement signals from the measurement converters 95, 146, 16, and 18.

The shut-off magnetic valve 148, which pneumatically activates the shut-off valves 142 and 143, is, on the other hand, not controlled by the regulation electronic board 6, but rather by the emergency brake loop, which is independent of the electronic board.

In addition, the mechanically actuatable rapid-braking valves 26 and 27 are represented. The control circuit for both control stations include control devices 148 or 149, respectively, an adapter keys 150 or 151 respectively, a pneumatic valve lock 152 or 153, respectively, equipped with electrical contacts, and also in each case, a sifa key 25 and an ATC key 5.

In FIG. 8, only the indirect servo driver brake valve system, which is dependent on electronic setting, and the mechanically actuatable rapid-braking valves are represented. In addition, for security reasons, a direct servo driver brake valve system, which is dependent on pneumatic setting (not shown) may be provided as an additional brake as well as an indirectly-effective emergency operation system which, after a reversal switch of the driver brake valve is thrown, is controlled by the supplemental brake. The indirect and direct driver brake valve systems are shut off together by the pneumatic valve lock 152 or 153, respectively, which is equipped with electrical contacts.

In FIG. 8, the driver brake valve is represented in drive position. On the control station represented at the left, the valve lock 152 is opened, the driver brake lever 154 of the control device 148 is in drive position.

The valve lock 153 of the control station represented at the right, on the other hand, is closed.

When the valve lock 152 is opened, the contact b is opened and contact a is closed. This causes the bridging of the rapid-break contact SB in the control device 148 to be interrupted and the regulation electronic board 6 to be supplied with power due to the excitation of the relay A. This relay A switches other functions, which are not represented here. By way of the diode D1, the relay C is excited, and the shut-off magnetic valve 148 is switched parallel into the power circuit of the emergency brake loop, and is excited. The valve 148 opens and allows the HB pressure onto the pressure switch 146 and the shut-off valves 142 and 143 in the relay valve, causing them to move to the open position shown. The pistons 155 and 156 are thereby dislocated to the left and right, respectively, and open the valve seats 157 and 158, respectively, so that A pressure can reach the chamber 159 and HL pressure can reach the chamber 161 of the relay valve 141 by way of the nozzle 160. Thus, the relay valve is actuated and connected with the main air line 11. The pressure switch 146 signals that the condition of the shut-off valves 148, 142 and 143 is that of being subjected to pressure, i.e., open.

The analog-converter regulates the level of A pressure according to the signals for braking, release, adaptation and injection. The relay valve 141 then sets the corresponding pressure in the main air line 11 in a manner which is known per se.

The braking and release procedures will now be described. Depending upon the position of the driver brake lever 154, the voltage drop at the setting potentiometer 162 of the control device 148 is altered. As is explained in detail in connection with FIG. 5, this signal reaches the regulation electronic board 6 which controls the magnetic valves 93, 94 and 96, so that the air intake and ventilation of the control container 12 and the level of the A pressure, respectively, are controlled. The momentary level of the A pressure is measured by means of the pressure pick-off 95, and is reported to the regulation elctronics board 6. By means of pulse-modulated control of the braking or release magnetic valves 94 and 93, respectively, the A pressure is brought up to the requisite level. Pressure losses are automatically backfed. In detail: the HB pressure is limited in the pressure reduction valve 140 to a prescribed, settable (screw 163) value of, for instance, 6 bar and arrives by way of a check valve 164 at the entry of the release magnetic valve 93. If this is opened by excitation, a reduced HB pressure reaches the A pressure container 12 and also, by way of the open shut-off valve 142, the chamber 159. The membrane piston 162, which is under HL pressure on the other side, is dislocated toward the right and opens the valve seat 163 so that HB pressure can flow out of the space 164 into the space 165, from where it reaches the HL line 11 by way of the jet 166.

During braking, the magnetic valve 94 is exited, the A pressure is reduced by way of the opening 13, whereupon the diaphragm piston 162 moves to the left, causing the valve seat 167 to be opened so that the pressure in the chamber 165 can dissipate through the hollow shaft of the diaphragm piston 162 to the chamber 168 and from there to the opening to the atmosphere 169, which causes the HL pressure to drop.

Between the drive and full-braking positions, six screened braking and release steps can be accessed. The first braking step leads to a pressure drop of 0.4 bar in the main air line 11. This corresponds simultaneously to the next-to-last release step. The last release step is set at approx. 0.3 bar below regulation pressure.

If the driver brake handle 154 is pulled to the rapid-braking position, the switch SB in the control device 148 is opened. This causes a servo magnetic valve (not shown) of the sifa valve to be deactivated and the servo-space in the sifa valve to be vented, causing the piston of the sifa valve to vent the main air line 11 by its major cross section. Simultaneously, the shut-off magnetic valve 148 is deactivated, the shut-off valves 142 and 143 are closed, since the HB pressure required for their activation is reduced through the shut-off magnetic valve, causing the pistons 155 and 156 to be moved toward the right and left, respectively and the valve seats 157 and 158, respectively, to be closed. This prevents the backfeed through the relay valve 141 into the main air line 11.

When the main air line pressure falls to about 0.8 bar, the piston of the sifa valve closes again automatically.

If the driver brake lever 154 is moved back out of the rapid-braking position, the switch SB on the control device 148 closes. The magnetic valve of the sifa valve and teh shut-off magnetic valve 148 are excited so that the main air line 11 can be refilled from the relay valve 141. The rapid braking cannot be initiated from the shut-off control device. For this purpose, the installed emergency braking levers 26 and 27 are available in case of emergency.

Hereinbelow, the adaptation procedure will be explained: By pressing the adaptation button 150 (or 151, if appropriate) on the unlocked control device 148 (or 149), the main air line can be overloaded. The longer the button is depressed, the more the A pressure is increased. The maximum overload is achieved in about ten seconds. The adapter is effective only when the driver brake lever is in the drive position. Following each release procedure, an overload to speed up the release is automatically set by the regulation electronic board. The level of this overload is dependent on the magnitude of the preceding braking. The overlaod is reduced so slowly, in accordance with a predetermined gradient (impulse generator 73 in FIG. 50) that the control valves are not affected. For the injection, the driver braking lever 154 is set to the filling position, the switch FÜ closes, whereupon the injection magnetic valve 96 is activated by means of the regulation electronic board. HB pressure acts upon the spring-tensioned piston 170 of the injection valve 147, causing the valve seat 171 to open and the A pressure to be raised to the level of HB pressure. This causes the piston 162 in the relay valve 141 to move clear through and for its part to open the valve seat 163. Simultaneously, the cross-section exchange magnetic valve 145 is activated, HB pressure reaches the valve piston 172, causing a major cross-section valve seat 173 to be opened so that a high-pressure injection can be set in the main air line. If the driver brake lever 154 is pushed back to the drive position from the filling position during release, the HB pressure in the servo circuit is reduced by means of the outlet jet 13 of the magnetic valve 94. In this way, the high-pressure injection does not collapse abruptly, but rather is reduced in a gradual, controlled manner. In this way, e.g., an undesirable load on sensitively adjusted rapid-breaking accelerators with insufficient injection protection can be reliably avoided.

When the A pressure is reduced to about 5.2 bar, the A pressure is steadily brought to the level of overload pressure that is automatically set at the end of an injection. The level of this overload is dependent on the duration of the injection and amounts to about 0.2 bar. This overload is set after an injection of about four second's duration. More extended injections do not increase the overload any further. The overload is reduced according to the same gradients as during an adaptation procedure.

Hereinbelow, the closure is explained: The contact a is opened and the contact b is closed through the locking of the valve locks 152 and 153, respectively. In this way, the relay A is unexcited and the regulation electronic board 6 inactivated. In addition, the relay C decreases, the contact C1 opens and the contact C2 closes. By the fall-off of the magnetic valve 148, the two locking valves 142 and 143 in the relay valve are pneumatically closed, so that the pneumatic connections between the relay valve and the main air line and between the relay valve and the A pressure line are interrupted. Simultaneously, the A pressure in the relay valve 141 is reduced to about 2.5 bar (controlled by the A pressure effect on the piston 155 from the chamber 159, against the pressure from a spring), so that an untight locking valve can in no case lead to the release of the brake.

By locking the valve lock, a valve lock piston is also activated, which delivers the HB pressure to the additional brake (which is not shown) and activates it.

Both control devices 148 and 149 also have additional contacts for an E-brake, but these are of no further interest in this connection.

The manner of operation of the measurement sensors 16 and 18 for the acceleration of the release was explained in detail in connection with FIG. 5 and especially with FIG. 7, so that it need not be discussed further here.

Since the general construction and function of the pneumatic relay valve 141 are known, more detailed discussion can be dispensed with in this case as well.

FIGS. 9A and 9C show the assignment of function, activation elements and input signals of the driver brake valve according to the invention. The meaning of the abbreviations used has been explained in connection with FIG. 7. The symbol "O" indicates no signal, and the symbol "U" indicates the presence of a signal. "Lock I" and "Lock II" designate the valve locks 152 and 153, respectively, of the control stations A and B, according to FIG. 8.

On this basis, the FIGS. 9A and 9B are easily understandable without further explanation.

FIG. 9C also shows possible input signal combinations for functional control, as well as unauthorized input signal combinations, the appearance of which leads to full braking.

In the case of unauthorized input signal combinations, contradictions are recognized in each case, e.g.:

simultaneous appearance of the signals FSA and FSB (i.e., both control stations may not be occupied);

simultaneous braking and adaptation, simultaneous breaking and filling; in which connection it should be pointed out that the braking signal "BRE" is present in inverse logic.

FIG. 10 shows the air flow-through through the HB line, dependent on time, and has already been explained in connection with FIG. 7, at the point where the recognition of train separation was described. The diagram was written for a train containing 84 cars with a 1"-main air line which is back-fed through a UIC nozzle. "Without train separation" means that the main air line is tight; "with train separation" means that the main air line has an opening of 10 mm diameter.

FIG. 11 shows the static signal characteristics of the HL pressure in dependence on the ideal braking value. In particular, the start-up behavior (structural components 64 and 65 of FIG. 5C) is recognizable, whereby the threshold values S2 and S1 of FIG. 11 correspond to the threshold values $S_{P2}$, $S_{P1}$ and $S_{A1}$, $S_{A2}$, respectively, of the structural components 64 and 65. Also, the inversion (subtractor 67) as well as the addition of the basic ideal value $U_O$ (integrator 71 and 92 of FIG. 5C) are explained.

FIG. 12 shows the gradients of the ideal pressure value during braking and release, which is given by the time frame 69 of FIG. 5C. The braking time in this case is $T_{BE}$, while the release time is $T_{BA}$.

FIGS. 13 and 14 show the progress of the pressure and of the desired pressure value, respectively for manual and automatic adaptation. The gradients for rise and fall, which are generated by the frequency switch-over of the impulse generator 73, are designated as "TANE" and "TANA," respectively. It is notable that with reduction in pressure, there is a virtually linear decline. From FIG. 14, the adaptation super-increase can also be recognized.

FIG. 15 shows the progress of the desired pressure value and the adaptation value at injection, for both short and long injections or adaptation procedures.

To summarize briefly, the driver braking valve according to the invention has the following characteristics: a part of the driver braking valve is responsible for all functions of the operational braking area. A desired value for the servo pressure (A pressure) is formulated purely electronically, is tranformed into a pneumatic pressure in an analog converter, and then controls a relay valve in a conventional manner. A second part is responsible only for rapid braking, the control using the quiescent current principle for safety reasons. This part is independent of the regulation electronic board. The structure of the operational braking area is as follows:

a) Servo facilities which operate purely electrically are available at the drive panel, namely:
Lock, driver brake lever, adapter, injection activation. Their function is the emission and/or generation of a signal.

(b) A central regulation electronic system for all control and regulatory functions of this part of the system, after processing of all entry signals, emits an A pressure desired value ($U_{IDEAL}$), and, under certain circumstances, automatic full braking.

(c) A central electro-pneumatic operating part with an EP converter, relay valve and sensors for A and HB pressure and flow-through reports actual values to the regulatory electronic board. The main regulatory size is A pressure. The HL value is passed on by way of the relay valve. With these basic structures, produce the following advantages:

Design of service elements which are advantageous from an installation point of view, since pneumatic lines are omitted.

Replacement of expensive and voluminous mechanical-pneumatic control and regulatory elements by the central regulatory electronic board.

Functional improvement by means of higher-performance control, regulatory and monitoring logics.

The central regulatory electronic board performs the following basic functions:

(a) Selection, in each case, of the maximum brake request signal from the entries from:
the control station (BRE or POTi)
automatic train control (ATC)
automatic train drive (AFB)

(b) Analysis of the desired functions from combination of the entry signals, including:
lock activation (FSA, FSB, ABE)
control facilities at the driver panel (BRE and LÖE, or POTi, adaptation, injection, rapid-braking)
braking request by radio (logic, see FIG. 9).

The suggested logic permits the absolute determination of the various functions, including:
Off, tightness check, braking, release, adaptation, injection.
Failure operations are entirely avoided.

(c) Agreement between non-step (AFB, ATC) and stepped brake request signals (POTi, step switch) by means of special start-up behavior. For the non-step signal, a threshold at the level of the first braking step of the stepped signal is generated below which the non-step brake request signal remains ineffective.

(d) Taking into account of the pressure drop in the HL line and the pressure difference A/HL at the relay valve. For this purpose, an additional pressure pick-off is installed at the HL connection and a flow-through meter at the HB connection. The pressure-sensor HL outputs the pressure difference A/HL. The flow-through pick-up (aperture and pressure-difference measurement) delivers the information concerning the pressure drop in the HL line up to the first control valve, by means of the $\Delta P$ signal. The A-pressure ideal value is raised by the aid of these measurements in such a way that the HL pressure at the first control value is not raised above the functionally premissible level.

(e) Taking into account additional A-pressure desired value components of the adapter and the injection. The A pressure desired value is additionally raised by these desired value components.

(f) The adaptation function is provided in detailed form. For this purpose, the activation duration of the manual adapter, the manual injection or the magnitude of the release step is converted into a corresponding number of impulses which are in turn converted into a corresponding A pressure desired value. The reduction of the desired value component occurs analogously (D/A-converter 75) by means of a reverse count, whereby the frequency of the reverse count is necessarily lower in order to satisfy the UIC stipulations concerning reduction of A super-pressure.

With release procedures, the A super-pressure is dependent not only on the release step but also on the backfeed behavior, conditioned by the configuration of the train (long trains, etc.). For this purpose, the progress of the backfeed is picked up at intervals:

With largely constant backfeed during the pick-up period, a long and/or untight train is involved. The counter situation is raised and the A pressure component is increased in order to shorten the release procedure.

With decreasing backfeed, a short train is involved, so that the adapter component is reduced, since it can be assumed that the release procedure will soon terminate.

In addition, the backfeed effectiveness in the release procedure is compared with the stored value of the backfeed in the preceding released condition. If the backfeed figures being compared have reached a defined convergent relationship, the adapter-procedure is brought to its conclusion in a controlled manner. This prevents the possiblity that the above-described logic might not bring the adaptation procedure to its conclusion in the case of very un-tight trains.

(g) Automatic injection functions: with all release procedures, short defined injections occur, whose duration is determined by the release procedure (release step). By means of the automatic adaptor, the manual injection of arbitrary duration becomes superfluous.

(h) Monitoring of train separation: the high-precision, hysteresis-free ascertainment of backfeed effect enables the continuous monitoring of the brake system for train separation, or defects in the HL line. As a criterion, the unfounded increase in the backfeed effect is utilized. The monitoring logic therefore excludes:

Increase of the backfeed effect on the basis of A pressure increase by means of the adaptation function. These changes must be closely associated chronologically.

Increase of the backfeed effect on the basis of fluctuating lack of tightness of the train configuration. The renewed drop in backfeed effect deletes the message of train separation.

Increase of backfeed effect on the basis of fluctuating HB pressure. The increase of backfeed effect within defined limits is justified if simultaneous compressor operation is reported.

(i) Delayed braking during driver position change: During driver position change, the brake system is briefly placed in the OFF position. However, it is not advantageous to briefly extensively vent the main air line. Therefore, the input signal combination occurring upon driver position change is used in order to delay the venting of the main air line. The withdrawal of the key, for instance, is determined with a time-dependent installation by the following signal combination:

| Before: | FSA | FSB | ABE | BRE | LOE | ANE | FUE |
|---|---|---|---|---|---|---|---|
| | U | 0 | 0 | 0 | 0 | 0 | 0 |
| | 0 | U | 0 | 0 | 0 | 0 | 0 |
| After: | 0 | 0 | 0 | 0 | 0 | 0 | 0 |

Thus, FSA or FSA changes to 0, when ABE=0.

In this situation, the installation would, for instance, be transferred for 15 seconds into the minimum brake step. Subsequently, the OFF condition will automatically be assumed, the relay valve being locked and the HL line vented toward 0.

This procedure differs from the point of view of signals only by ABE from the radio-operated braking procedure; for the following signal combination, the following is valid:

FSA, FSB, BRE, LÖE, ANE, FÜE=0

ABE=U

In this case, as is well known, braking will rapidly be implemented, and the relay valve is not locked.

The disappearance of ABE (ABE moves to 0) at FSA=FSB=0 is considered an operational interference in radio operation and leads to immediate full braking. An operational risk due to delayed braking is thus eliminated.

A further special advantage of the invention is seen in the improved release function, which not only reduces the release time of long trains to the shortest possible time, but also permits the recognition of a defect in the HL line in the worst-case situation (train separation during release).

We claim:

1. A driver brake valve for operating compressed air brakes of rail vehicles comprising:

an electro-pneumatic converter for converting an electrical input control signal to a pneumatic servo pressure, said converter connected to a pilot pressure line and having release and braking valves, as well as an injection valve connected to an air supply line (10) for rapidly pressurizing said pilot pressure line;

a monitoring facility which monitors the fading of pressure in said pilot pressure line after rapidly pressurizing of said pilot pressure line. and generates an error defect signal ($F_FU$) if said pressure does not decrease in a predetermined time interval;

a relay valve connected to said pilot pressure line and a main air line;

a pressure/voltage transformer which generates a signal proportional to said pneumatic servo pressure;

a pressure sensor connected to said main air line for supplying a pressure signal;

a regulation electronic circuit for receiving a plurality of electrical control signals, said signal proportional to said pneumatic servo pressure and said pressure sensor output signal, said regulation electronic circuit generating an ideal value control signal which is transmitted to said electopneumatic converter; and a circuit for generating an electrical brake demand signal for said regulation electronic circuit, including a threshold value circuit which inhibits said demand signal until said demand signal exceeds an initial braking step level in both a braking and release command.

2. A driver brake valve according to claim 1, comprising second monitoring facility (112) which monitors various supply voltages, and generates error signals ($F_{U1}$, $F_{U2}$, $F_{UGGS}$) in case of deviation of the supply voltages from predetermined upper and/or lower limit values.

3. A driver brake valve for pneumatic braking of rail vehicles comprising:

an electro-pneumatic converter with magnetic release and braking valves (12, 13) for converting electrical control signals into a pneumatic-servo pressure of a pilot pressure line;

a relay valve (9) connected to said pilot pressure line and to a main container air line (11) for controlling pressure in said main container air line (11) as a function of said pneumatic-servo pressure;

a flow sensor (18) connected to an air supply line (10), said air supply line (10) connected through an injection valve (96) to said pilot pressure line;

a pressure/voltage transformer (95) for generating an actual value signal ($U_{ISTA}$) proportional to said pneumatic-servo pressure;

a pressure sensor (16) in said main container line air line (11) for supplying an air pressure signal;

a regulation electronic circuit for receiving an electrical brake demand signal, and receiving said pressure/voltage transformer signal representing said measured pneumatic-servo pressure, said flow sensor signal, and generating a desired electrical signal representing an ideal value signal as an input signal for said electro-pneumatic converter, said electronic circuit including:

a subtractor for receiving said main container air supply line (11) pressure sensor signal and said desired ideal value control signal (USOLL);

a controller for receiving said subtractor output signal;

a combining circuit connected to receive a signal from said controller and said air supply line (10) flow sensor (19) signal;

a combining circuit connected to receive a signal from said first combining circuit and said desired control signal (USOLL);

a third combining circuit connected to receive a signal from said second combining circuit and said signal from said pressure/voltage transformer (95) representing said pneumatic servo pressure;

a second controller for receiving a signal from said third combining circuit whereby a control signal for said release and braking valves in said electro pneumatic converter is produced for changing said pneumatic servo pressure and controlling said relay valve (9); and means for generating said electrical brake demand signal, including a threshold value circuit for applying said brake demand signal when a threshold level of said brake demand signal is reached to said regulation electronic circuit corresponding to an initial braking step.

4. A driver brake valve according to claim 3, wherein a brake request signal (ATC; AFB) originating from an automatic vehicle control (ATC) or an automatic drive and brake control (AFB) is monitored in a second threshold-value circuit (65), and is only applied to said regulation electronic circuit when a second threshold value ($S_{A1}$, $S_{A2}$) which corresponds to said initial braking step is reached, and a maximum-value selection circuit (47, 50, 63) provided for selecting a maximum brake request signal from said automatic vehicle control and said automatic drive and brake control.

5. A driver brake valve according to claim 4, wherein the maximum brake request signal ($U_{B1}$) is subtracted from a maximum possible brake request signal ($U_{BMAX}$) in a subtractor circuit inverting said maximum brake request signal.

6. A driver brake valve according to claim 5, wherein the rise and fall times of the inverted maximum brake request signal ($U_{B1}$) are limited by a time frame.

7. A driver brake valve according to claim 6, wherein the rise and fall time limited, inverted maximum brake request signal ($U_{BV1}$) is multiplied by a factor ($K_B$) in a multiplier (70) and is, passed to an integrator (71) in which it is increased by correction magnitudes ($\Delta U_O$, UO, $U_{FU}$, $U_{AG}$) for formulating the desired ideal value signal ($U_{IDEAL}$).

8. A drive brake valve according to claim 3, wherein the desired ideal value signal ($U_{IDEAL}$) is compared in a comparator (99) with said actual value signal ($U_{ISTA}$) of said pressure/voltage transformer which measures pneumatic servo-pressure on pilot pressure line (8), and the difference between said compared signals is applied to a regulator (101) and two sign-digit discriminators, said regulator and sign-digit discriminator selectively controlling the braking magnetic valve (94) and the release magnetic value (93) of said electro-pneumatic converter, by means of which the pressure of said pilot pressure line is shut off.

9. A driver brake valve according to claim 8, comprising a final-step switch (104, 105) which halts the control of the brake and release magnetic valves (94, 93) as long as the pressure monitored by a pressure switch (146) in the main container does not exceed a predetermined minimum value.

10. A driver brake valve according to claim 9, wherein said final-step switch (104, 105) which is switched on after an electrical energy supply is switched on during a predetermined time interval.

11. A driver brake valve according to claim 8, wherein said injection valve (96) connects the main container line directly with the pneumatic servo-pressure of the pilot pressure line in response to an injection signal, and wherein the injection signal is limited by time frames (83, 84) in its rise and fall time, and the time limited injection signal is integrated in an integrator (71) and combined with the desired value signal ($U_{IDEAL}$).

12. A driver brake valve according to claim 11, wherein an injection request signal sets a flip-flop (89), which enables a cross-section relay (56) which activates a cross-section magnetic valve which, during an injection, opens a major cross-section valve seat which connects the main container line and main air line with one another.

13. A driver brake valve according to claim 12, wherein the flip-flop (89) is reset by a threshold circuit when the actual value signal ($U_{ISTA}$) connected to the threshold circuit reaches a threshold value ($U_R$) when the pneumatic servo-pressure signal ($U_{ISTA}$) reaches a threshold value ($U_R$).

14. A driver brake valve according to claim 7, further comprising for implementation of an adaptation function, a frequency-switchable impulse generator (73) connected to a series-switched, forward-backward resettable counter (74) connected to a series-switched digital/analog converter (75) which generates an adaptation signal ($U_{AG}$) which is integrated in an integrator (71) to derive the desired value signal ($U_{IDEAL}$).

15. A driver brake valve according to claim 14, wherein, during the adaptation function, the applied pressure produced by said pressure/voltage transformer is, after a pressure increase, reduced time-linearly by means of the counter (74) which is switched to count downwardly.

16. A driver brake valve according to claim 14, wherein the adaptation function is also used for rapid brake release.

17. A driver brake valve according to claim, wherein the adaptation procedure is ended when the counter (74) reaches the value of zero.

* * * * *